US012780015B2

(12) United States Patent
Shimoike et al.

(10) Patent No.: US 12,780,015 B2
(45) Date of Patent: Nov. 3, 2026

(54) ELECTRIC WORK VEHICLE

(71) Applicant: KUBOTA CORPORATION, Osaka (JP)

(72) Inventors: Yuki Shimoike, Sakai (JP); Shinichi Kawabata, Sakai (JP); Kenji Mitsui, Sakai (JP); Katsumi Matsufuji, Sakai (JP); Yoshiki Mizoguchi, Sakai (JP); Yuta Inoue, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 244 days.

(21) Appl. No.: 18/734,656

(22) Filed: Jun. 5, 2024

(65) Prior Publication Data

US 2024/0317077 A1 Sep. 26, 2024

Related U.S. Application Data

(63) Continuation of application No. PCT/JP2022/045287, filed on Dec. 8, 2022.

(30) Foreign Application Priority Data

Dec. 24, 2021 (JP) ................................ 2021-211648
Dec. 24, 2021 (JP) ................................ 2021-211649
Dec. 24, 2021 (JP) ................................ 2021-211650

(51) Int. Cl.
*B60L 50/64* (2019.01)
*B60L 50/60* (2019.01)
(Continued)

(52) U.S. Cl.
CPC ............... *B60L 50/64* (2019.02); *B60L 50/66* (2019.02); *B60L 58/26* (2019.02);
(Continued)

(58) Field of Classification Search
CPC .......... B60L 50/64; B60L 50/66; B60L 58/26; B60K 1/04; H01M 10/613; H01M 10/625;
(Continued)

(56) References Cited

U.S. PATENT DOCUMENTS

2013/0149583 A1* 6/2013 Kurita ................ H01M 10/613 429/120
2013/0216874 A1* 8/2013 Endo .................. H01M 10/613 429/83
(Continued)

FOREIGN PATENT DOCUMENTS

CN 208955125 U 6/2019
CN 211931142 U 11/2020
(Continued)

OTHER PUBLICATIONS

Official Communication issued in corresponding Japanese Patent Application No. 2021-211648, mailed on Oct. 8, 2024, 3 pages.
(Continued)

*Primary Examiner* — Timothy Hannon
(74) *Attorney, Agent, or Firm* — Keating & Bennett, LLP

(57) ABSTRACT

A battery includes a housing case accommodating battery modules, a pre-charge portion to perform processing to gradually supply power to an inverter at a start of power supply from the battery to the inverter, and a discharge portion to perform processing to discharge power remaining in the inverter in response to a power supply from the battery to the inverter being shut off. The pre-charge portion and the discharge portion are provided in the housing case.

7 Claims, 15 Drawing Sheets

(51) Int. Cl.

| | |
|---|---|
| ***B60L 58/26*** | (2019.01) |
| ***H01M 10/613*** | (2014.01) |
| ***H01M 10/625*** | (2014.01) |
| ***H01M 10/6563*** | (2014.01) |
| ***H01M 50/204*** | (2021.01) |
| ***H01M 50/244*** | (2021.01) |
| ***H01M 50/249*** | (2021.01) |
| ***H01M 50/262*** | (2021.01) |

(52) U.S. Cl.
CPC ....... *H01M 10/613* (2015.04); *H01M 10/625* (2015.04); *H01M 10/6563* (2015.04); *H01M 50/204* (2021.01); *H01M 50/244* (2021.01); *H01M 50/249* (2021.01); *H01M 50/262* (2021.01); *B60L 2200/40* (2013.01); *H01M 2220/20* (2013.01)

(58) Field of Classification Search
CPC ........... H01M 10/6563; H01M 50/204; H01M 50/244; H01M 50/249; H01M 50/262; H01M 2220/20
See application file for complete search history.

(56) References Cited

U.S. PATENT DOCUMENTS

| | | | | |
|---|---|---|---|---|
| 2015/0329175 | A1 | 11/2015 | Inoue | |
| 2015/0329176 | A1 | 11/2015 | Inoue | |
| 2018/0145380 | A1* | 5/2018 | Zhao | H01M 50/211 |

FOREIGN PATENT DOCUMENTS

| | | | |
|---|---|---|---|
| CN | 212164220 | U | 12/2020 |
| JP | WO2014102851 | A1 | 7/2014 |
| JP | WO2014102854 | A1 | 7/2014 |
| JP | 2015-158979 | A | 9/2015 |
| JP | 2015159032 | A | 9/2015 |
| JP | 2016159789 | A | 9/2016 |
| JP | 2021-000953 | A | 1/2021 |
| JP | 2021-000955 | A | 1/2021 |
| WO | 2020059164 | A1 | 3/2020 |

OTHER PUBLICATIONS

Official Communication issued in corresponding Japanese Patent Application No. 2021-211649, mailed on Mar. 4, 2025, 3 pages.

Official Communication issued in corresponding European Patent Application No. 22910923.6, mailed on Feb. 10, 2026, 14 pages.

Official Communication issued in International Patent Application No. PCT/JP2022/045287, mailed on Feb. 14, 2023.

* cited by examiner

ELECTRIC WORK VEHICLE

CROSS REFERENCE TO RELATED APPLICATIONS

This application claims the benefit of priority to Japanese Patent Application Nos. 2021-211648, 2021-211649 and 2021-211650 filed on Dec. 24, 2021 and is a Continuation Application of PCT Application No. PCT/JP2022/045287 filed on Dec. 8, 2022. The entire contents of each application are hereby incorporated herein by reference.

BACKGROUND OF THE INVENTION

1. Field of the Invention

The present invention relates to electric work vehicles each configured such that a travel device is driven by a motor. The present invention also relates to, in electric work vehicles each including a battery, a motor to be driven by power supplied from the battery, and a travel device to be driven by the motor, a structure to cool the battery. The present invention also relates to, in electric work vehicles each including a battery, a motor to be driven by power supplied from the battery, and a travel device to be driven by the motor, a configuration of the battery.

2. Description of the Related Art

As disclosed in JP 2021-955A, some electric work vehicles include a battery and an inverter supplied with power from the battery and have a configuration in which a motor is driven by power supplied from the inverter.

As disclosed in JP 2021-953A, some electric work vehicles of an air-cooling type include a cooling fan provided outside of a battery installed in a body, so that an air flow is generated outside of the battery by the cooling fan to cool the battery.

As disclosed in JP 2021-953A, some electric work vehicles have a configuration in which the entirety of a battery is constituted by stacks with a plurality of battery modules coupled to each other, and the stacks are aligned adjacent to each other and are housed in a housing case.

SUMMARY OF THE INVENTION

Such an electric work vehicle as described above may be provided with a pre-charge portion and a discharge portion. The pre-charge portion performs processing to gradually supply power to the inverter at a start of power supply from the battery to the inverter. In response to power supply from the battery to the inverter being shut off, the discharge portion performs processing to discharge power remaining in the inverter.

Example embodiments of the present invention provide electric work vehicles in each of which a pre-charge portion and a discharge portion are provided in a compact manner.

In contrast to an electric work vehicle of an air-cooling type in which the outer side of the battery is cooled by air as described above, an electric work vehicle of an air-cooling type in which the inner side of the battery is cooled by air has been proposed.

Example embodiments of the present invention provide electric work vehicles in each of which an inside of a battery is efficiently cooled by air.

When an electric work vehicle travels on an uneven surface of the ground, vibration during the travel may be transmitted from the housing case to the stacks and the stacks (battery modules) may vibrate against the housing case. Accordingly, there is room for improvement in reducing or preventing the vibration of the stacks (battery modules) against the housing case.

Example embodiments of the present invention provide electric work vehicles in each of which vibration of stacks (battery modules) against a housing case is reduced or prevented.

An example embodiment of the present invention provides an electric work vehicle including a battery, an inverter to be supplied with power from the battery, a motor to be driven by power from the inverter, and a travel device to be driven by the motor, wherein the battery includes a housing case in which a plurality of battery modules are housed, a pre-charge portion to perform processing to gradually supply power to the inverter at a start of power supply from the battery to the inverter, and a discharge portion to perform processing to discharge power remaining in the inverter in response to a power supply from the battery to the inverter being shut off, and the pre-charge portion and the discharge portion are provided in the housing case.

According to an example embodiment of the present invention, when the battery includes the housing case in which the plurality of battery modules are housed, since the pre-charge portion and the discharge portion are provided in the housing case, the battery realizes a compact layout of the housing case in which the plurality of battery modules are housed, the pre-charge portion, and the discharge portion. This is advantageous in terms of simplification of the structure.

According to an example embodiment of the present invention, there is no need of providing the pre-charge portion and the discharge portion at positions separate from the battery, which is also advantageous in terms of saving a space near the battery in the electric work vehicle.

In an example embodiment of the present invention, preferably, the pre-charge portion and the discharge portion are provided in an upper portion of the housing case.

According to an example embodiment of the present invention, since the pre-charge portion and the discharge portion are provided in an upper portion of the housing case, heat generated in the pre-charge portion and the discharge portion easily escapes upward, which is advantageous in terms of the heat dissipation of the battery.

In an example embodiment of the present invention, preferably, the pre-charge portion and the discharge portion are provided at a rear end of the housing case.

According to an example embodiment of the present invention, since the pre-charge portion and the discharge portion are provided at the upper rear end of the housing case, and heat generated in the pre-charge portion and the discharge portion easily escapes upward and rearward, which is advantageous in terms of the heat dissipation of the battery.

In an example embodiment of the present invention, preferably, the housing case is quadrangle-shaped when viewed in a plan view, and the pre-charge portion and the discharge portion are provided in a right or left corner at the rear end of the housing case.

According to an example embodiment of the present invention, since the pre-charge portion and the discharge portion are provided in a right or left corner at the upper rear end of the housing case, and heat generated in the pre-charge portion and the discharge portion easily escapes upward, rearward, and sideward, which is advantageous in terms of the heat dissipation of the battery.

In an example embodiment of the present invention, preferably, the housing case includes, on a top thereof, a housing cover covering the pre-charge portion and the discharge portion.

According to an example embodiment of the present invention, since the housing cover covering the pre-charge portion and the discharge portion is provided in an upper portion of the housing case, the pre-charge portion and the discharge portion are protected, which is advantageous in terms of preventing damage to the pre-charge portion and the discharge portion.

An example embodiment of the present invention provides an electric work vehicle including a battery, a motor to be driven by power from the battery, and a travel device to be driven by the motor, wherein the battery includes a stack in which a plurality of battery modules are coupled to each other, a housing case in which a plurality of the stacks are housed and aligned adjacent to each other with a predetermined gap therebetween, and a fan including a ventilation hole on an outer side of the housing case at a position facing the gap and being operable to be able to suck air in the housing case or supply air to the housing case via the ventilation hole.

According to an example embodiment of the present invention, the stack in which a plurality of battery modules are coupled to each other is included in the battery, and a plurality of the stacks are housed in the housing case.

In this case, the plurality of stacks are housed in the housing case and aligned adjacent to each other and spaced by a predetermined gap, and thus air easily flows through the gap between adjacent stacks.

According to an example embodiment of the present invention, the fan is provided, and the ventilation hole of the fan is on the outer side of the housing case at a position facing the gap between adjacent stacks, so that the ventilation hole is close to the gap between the adjacent stacks.

With this, when air is sucked (supplied) by the fan, air in the gap between adjacent stacks is efficiently sucked (air is efficiently supplied to the gap between adjacent stacks) through the ventilation hole of the fan, and flows in the gap between adjacent stacks, allowing the stacks to be efficiently cooled with the air and allowing the interior of the battery to be efficiently cooled with the air.

In an example embodiment of the present invention, preferably, the housing case includes an opening through which air is passable, the opening being provided at a position facing a terminal of the battery modules.

According to an example embodiment of the present invention, when air in the gap between adjacent stacks is sucked by the fan, air outside the housing case is introduced into the housing case.

Since the opening faces the terminal of the battery module of the housing case, air outside the housing case is passed through the opening of the housing case and is introduced into the housing case while passing by the terminal of the battery modules, allowing the terminal of the battery modules to be efficiently cooled. This is advantageous in terms of cooling the interior of the battery.

According to an example embodiment of the present invention, when air is supplied into the gap between adjacent stacks by the fan, air in the housing case is pushed out to the outside of the housing case.

Since the opening faces the terminal of the battery modules of the housing case, air in the housing case is passed by the terminal of the battery module and is pushed out to the outside of the housing case through the opening in the housing case, allowing the terminal of the battery modules to be efficiently cooled. This is advantageous in terms of cooling the interior of the battery.

In an example embodiment of the present invention, preferably, the plurality of battery modules are coupled to each other and aligned adjacent to each other to define the stack, and adjacent stacks are provided in a manner such that terminals of the plurality of battery modules in one stack and terminals of the plurality of battery modules in another stack face each other with the gap.

According example embodiment of the present invention, when gaps are provided between adjacent stacks, the battery modules of the adjacent stacks face the gaps.

With this, when air is sucked (supplied) by the fan and flows through the gaps between the adjacent stacks, the battery modules of the adjacent stacks are efficiently cooled with less imbalance, which is advantageous in terms of cooling the interior of the battery.

In an example embodiment of the present invention, preferably, the plurality of stacks are aligned in a horizontal direction, and the ventilation hole faces an upper portion of the gap.

According to an example embodiment of the present invention, since the plurality of stacks are aligned in the horizontal direction and the gap between adjacent stacks extend along the up-down direction, hot air in the gap easily rises upward of the gap.

According to an example embodiment of the present invention, since the ventilation hole of the fan faces an upper portion of the gap, the ventilation hole of the fan is located close to hot air gathering in the upper portion of the gap between adjacent stacks, and air is directly sucked (supplied) by the fan, which is advantageous in terms of cooling the interior of the battery.

In an n example embodiment of the present invention, preferably, the electric work vehicle includes a housing cover covering the fan and an upper portion of the housing case.

According to an example embodiment of the present invention, since the housing cover covering the fan and the upper portion of the housing is provided, the fan is protected, which is advantageous in terms of preventing damage to the fan.

In an example embodiment of the present invention, preferably, the housing cover includes an opening through which air is passable at a position facing a blowing direction or a sucking direction of the fan.

According to an example embodiment of the present invention, since the opening in the housing cover faces the blowing direction of the fan, when air in the gap between adjacent stacks is sucked by the fan, air blown from the fan easily flows out from the housing cover through the opening in the housing cover, which is advantageous in terms of cooling the interior of the battery.

According to an example embodiment of the present invention, since the opening in the housing cover faces the sucking direction of the fan, when air is supplied to the gap between adjacent stacks by the fan, air outside the housing cover is easily introduced into the housing cover via the opening in the housing cover, which is advantageous in terms of cooling the interior of the battery.

In an example embodiment of the present invention, preferably, the fan is capable of sucking air in the housing case, and in the one stack adjacent to one side of a central stack and another stack adjacent to another side of the central stack, a blowing direction of the fan with respect to the gap between the central stack and the one stack, and a blowing direction of the fan with respect to the gap between the central stack and the other stack are set as opposite directions so that blown air flows away from each other.

A case is assumed in which, for example, three stacks are aligned with a gap, a fan that corresponds to the gap between the central stack and one stack, and a fan that corresponds to the gap between the central stack and the other stack are provided, and the fans are capable of sucking air in the housing case.

According to an example embodiment of the present invention, air blown from one fan and air blown from the other fan flow in opposite directions so that they move away from each other, and thus air blown from the one fan and the other fan hardly gather at one position, which is advantageous in terms of cooling the interior of the battery.

In an example embodiment of the present invention, preferably, an electric work vehicle further includes a driving section in which an operator rides and performs driving, and a cover in front of the driving section and including, in a front portion of the cover, an introduction section through which external air is introduced, the cover including a top surface with a forward-descending shape in which the top surface descends toward a front side, wherein the battery is housed in the cover, and a housing cover that covers the fan and a top of the housing case is provided, and the housing cover includes a top surface with a forward-descending shape in which the top surface descends toward a front side, and the top surface of the housing cover and the top surface of the cover are spaced at a predetermined distance in an up-down direction.

In some electric work vehicles, a cover is in front of the driving section in which an operator rides and performs driving, and the battery is housed in the cover.

In this case, an introduction section through which external air is introduced is provided in a front portion of the cover, and as the electric work vehicle moves forward, air outside the cover may be introduced into the cover from the introduction section of the cover and may be supplied to the outside of the battery.

A configuration is also possible in which the top surface of the cover includes a forward-descending shape in which it descends toward the front side, and a field of front vision from the driving section is ensured.

According to an example embodiment of the present invention, since the housing cover covering upper portions of the fan and the housing is provided, the fan is protected, which is advantageous in terms of preventing damage to the fan.

According to an example embodiment of the present invention, since the top surface of the housing cover includes a forward-descending shape in which it descends toward a front side, and the top surface of the housing cover and the top surface of the cover are spaced at a predetermined distance in the up-down direction, the cross-sectional area of a space between the top surface of the housing cover and the top surface of the cover hardly varies from the front end of the housing cover to the rear end of the housing cover.

According to an example embodiment of the present invention, when, as the electric work vehicle moves forward, air outside the cover is introduced into the cover from the introduction section of the cover and enters the space between the top surface of the housing cover and the top surface of the cover, the air easily flow to the rear side without accumulating in the space between the top surface of the housing cover and the top surface of the cover.

This promotes exchange of air inside the cover (in the surroundings of the battery) and reduces or prevents an increase in temperature of the interior of the cover (in the surroundings of the battery), which is advantageous in terms of cooling the interior of the battery.

An example embodiment of the present invention provides an electric work vehicle including a battery, a motor to be driven by power from the battery, and a travel device to be driven by the motor, wherein the battery includes a stack in which a plurality of battery modules are coupled to each other, and a housing case in which a plurality of the stacks aligned adjacent to each other are housed, the housing case includes a plurality of lower supports coupled to lower portions of the battery modules, and a first lower frame extending along a space between adjacent lower supports, each of the lower supports includes a plurality of coupling portions protruding outward, the plurality of coupling portions being aligned and spaced at a predetermined distance, and adjacent lower supports are arranged such that the coupling portions of one lower support enter respective spaces between the coupling portions of the other lower support, and the coupling portions of the other lower support enter respective spaces between the coupling portions of the one lower support, and the coupling portions of the one lower support and the other lower support are coupled to the first lower frame.

According to an example embodiment of the present invention, the plurality of lower supports are provided in the housing case of the battery, lower portions of the battery modules are coupled to the lower supports, and lower portions of the stacks are supported by the lower supports. Each of the lower supports includes a plurality of coupling portions that protrude outward and are aligned and spaced at a predetermined distance, and the first lower frame extends along a space between adjacent lower supports.

According to an example embodiment of the present invention, adjacent lower supports are arranged such that the coupling portions of one lower support enter the respective spaces between the coupling portions of the other lower support, and the coupling portions of the other lower support enter the respective spaces between the coupling portions of the one lower support. The coupling portions of the one lower support and the other lower support are coupled to the first lower frame.

Due to a configuration in which the coupling portions of the one lower support and the coupling portions of the other lower support respectively entering the spaces defined by the coupling portions of the counterpart lower support, the coupling portions of the one lower support and the other lower support are reasonably coupled to the first lower frame even when multiple coupling portions are included in the one and the other lower supports.

As a result of the multiple coupling portions of the lower supports being coupled to the first lower frame, the stacks (battery modules) are firmly coupled to the first lower frame via the lower supports, thereby reducing or preventing the vibration of the stacks (battery modules) against the housing case, which is advantageous in terms of preventing damage to the stacks (battery modules).

In an example embodiment of the present invention, preferably, the coupling portions of the lower supports are tapered with a width thereof decreasing away from the corresponding lower support when viewed in a plan view.

According to an example embodiment of the present invention, due to the tapered coupling portions of the lower supports when viewed in a plan view, it is possible to set the distance between a coupling portion of one lower support and a coupling portion of another lower support in a longitudinal direction of the first lower frame to a small distance, compared to a case where the coupling portions of the lower supports are quadrangle-shaped when viewed in a plan view, making it possible to provide a large number of coupling portions in the lower support.

In contrast to the thin ends of the coupling portions of the lower supports, the base portions of the coupling portions of the lower supports have a large width, and thus the coupling portions of the lower supports have sufficient strength.

As a result, the one lower support and the other lower support can include a large number of coupling portions having sufficient strength and the stacks (battery modules) are firmly coupled to the first lower frame via the lower supports, which is advantageous in terms of reducing or preventing the vibration of the stacks (battery modules) against the housing case and preventing damage to the stacks (battery modules).

In an example embodiment of the present invention, preferably, the housing case includes a second lower frame parallel or substantially parallel to the first lower frame when viewed in a plan view, and the second lower frame supports connections of the lower support to the battery modules from below.

According to an example embodiment of the present invention, in the housing case of the battery, the second lower frame is parallel or substantially parallel to the first lower frame and the connections of the lower supports to the battery modules are supported by the second lower frame from below. That is, the portions of the lower supports apart from the coupling portions are supported by the second lower frame, and thus the weight of the stacks (battery modules) is supported by the first lower frame and the second lower frame via the lower supports.

This is advantageous in terms of reducing or preventing the vibration of the stacks (battery modules) against the housing case and preventing damage to the stacks (battery modules), since the coupling portions of the lower supports are coupled to the first lower frame, the portions of the lower supports away from the coupling portions are supported by the second lower frame, and the weights of the stacks (battery modules) are supported by the first lower frame and the second lower frame.

In an example embodiment of the present invention, preferably, the housing case includes a third lower frame perpendicular or substantially perpendicular to the first lower frame and the second lower frame when viewed in a plan view, and the third lower frame is coupled to the first lower frame and the second lower frame.

According to an example embodiment of the present invention, in the housing case of the battery, the third lower frame is perpendicular or substantially perpendicular to the first lower frame and the second lower frame when viewed in a plan view, and the third lower frame is coupled to the first lower frame and the second lower frame.

This is advantageous in terms of reducing or preventing the vibration of the stacks (battery modules) against the housing case and preventing damage to the stacks (battery modules), since the first lower frame and the second lower frame have improved rigidity relative to that of the third lower frame, and the weights of the stacks (battery modules) are supported by the first lower frame, the second lower frame, and the third lower frame.

In an example embodiment of the present invention, preferably, the housing case includes a plurality of upper supports coupled to upper portions of the battery modules, and an upper frame extending along a space between adjacent upper supports, each of the upper supports includes a plurality of coupling portions protruding outward, the plurality of coupling portions being aligned and spaced at a predetermined distance, adjacent upper supports are arranged such that the coupling portions of one upper support enter respective spaces between the coupling portions of the other upper support, and the coupling portions of the other upper support enter respective spaces between the coupling portions of the one upper support, and the coupling portions of the one upper support and the other upper support are coupled to the upper frame.

According to an example embodiment of the present invention, in the housing case of the battery, the plurality of upper supports are provided, upper portions of the battery modules are coupled to the upper supports, and upper portions of the stacks are supported by the upper supports.

Each of the upper supports includes a plurality of coupling portions that protrude outward and are aligned and spaced at a predetermined distance, and the upper frame is provided along a space between adjacent upper supports.

Adjacent upper supports are arranged such that the coupling portions of one upper support enter the respective spaces between the coupling portions of the other upper support, and the coupling portions of the other upper support enter the respective spaces between the coupling portions of the one upper support. The coupling portions of the one upper support and the other upper support are coupled to the upper frame.

Due to a configuration in which the coupling portions of the one upper support and the other upper support respectively entering the spaces formed by the coupling portions of the counterpart upper support, the coupling portions of the one upper support and the other upper support are reasonably coupled to the upper frame even when multiple coupling portions are included in the one upper support and the other upper support. As a result of the multiple coupling portions of the upper supports are coupled to the upper frame, the stacks (battery modules) are firmly coupled to the upper frame via the upper supports.

According to an example embodiment of the present invention, in addition to the lower portions of the stacks (battery modules) being supported by the first lower frame via the lower supports, the upper portions of the stacks (battery modules) are supported by the upper frame via the upper supports, and due to multiple coupling portions of the upper supports being coupled to the upper frame, the stacks (battery modules) are firmly coupled to the upper frame via the upper supports, which is advantageous in terms of reducing or preventing the vibration of the stacks (battery modules) against the upper frame via the upper supports and preventing damage to the stacks (battery modules).

In an example embodiment of the present invention, preferably, the coupling portions of the upper supports are tapered with a width thereof decreasing away from the corresponding upper support when viewed in a plan view.

According to an example embodiment of the present invention, due to the tapered coupling portions of the upper supports when viewed in a plan view, it is possible to set the distance between the coupling portion of one upper support and the coupling portion of the other upper support in a longitudinal direction of the upper frame to a small distance, compared to a case where the coupling portions of the upper supports are quadrangle-shaped when viewed in a plan view, making it possible to provide a large number of coupling portions in the upper support.

In contrast to the thin ends of the coupling portions of the upper supports, the base portions of the coupling portions of the upper supports have a large width, and thus the coupling portions of the upper supports have sufficient strength.

As a result, the one upper support and the other upper support can have a large number of coupling portions having sufficient strength and the stacks (battery modules) are firmly coupled to the upper frame via the upper supports, which is advantageous in terms of reducing or preventing the vibration of the stacks (battery modules) against the housing case and preventing damage to the stacks (battery modules).

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing a layout of an inverter and the like.

DETAILED DESCRIPTION OF THE EXAMPLE EMBODIMENTS

Figure 1:
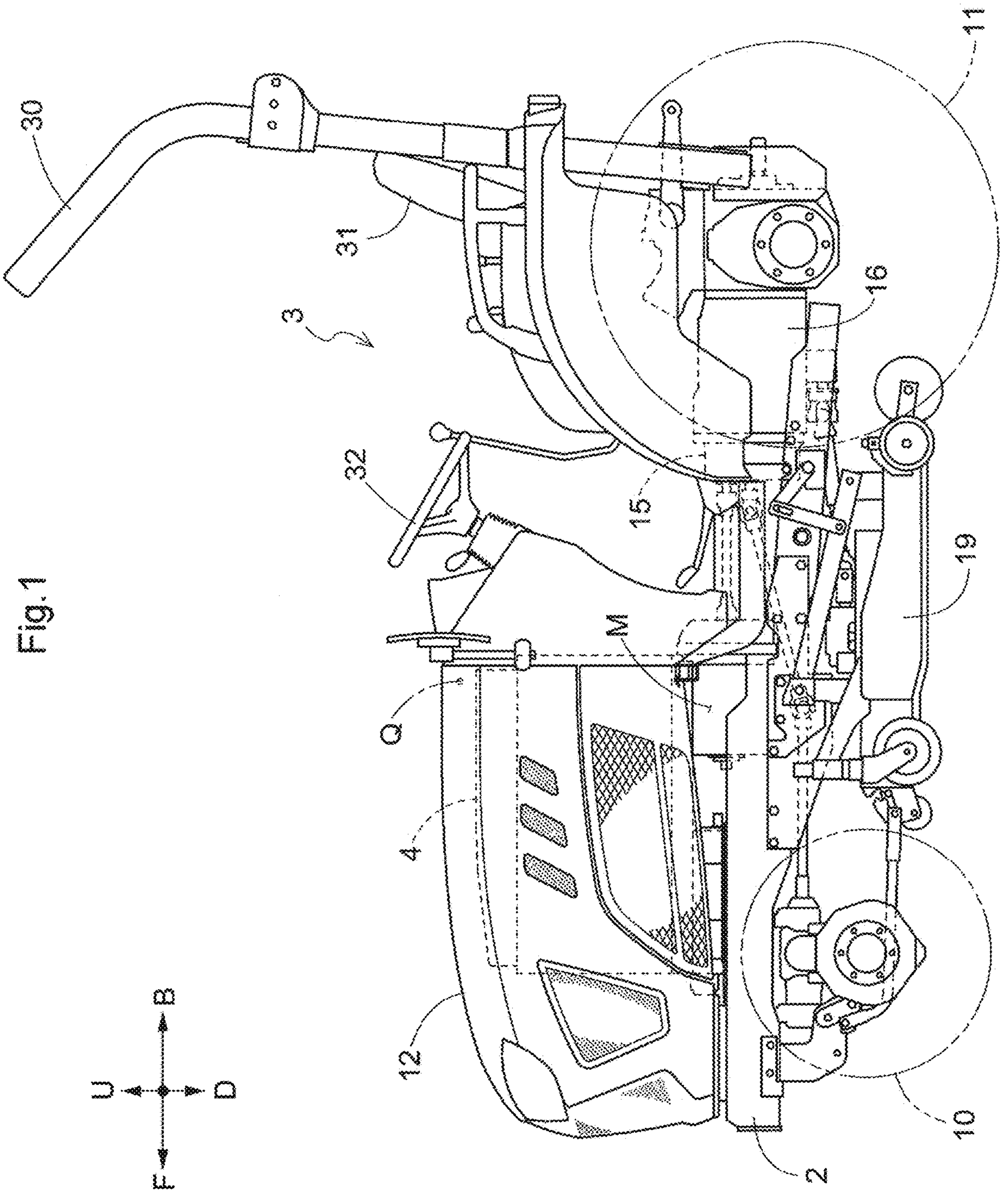
FIG. 1 is a left side view of a tractor.

Example embodiments of the present invention will be described based on the drawings. In the following description, unless otherwise stated, the direction of an arrow F and the direction of an arrow B in the drawings will be respectively referred to as "the front side" and "the rear side", and the direction of an arrow L and the direction of an arrow R in the drawings will be respectively referred to as "the left side" and "the right side". Also, the direction of an arrow U and the direction of an arrow D in the drawings will be respectively referred to as "the upper side" and "the lower side".

The following describes a tractor according to the present example embodiment. As shown in FIG. 1, the tractor includes left and right front wheels 10, left and right rear wheels 11, and a cover 12.

The tractor also includes body frames 2 and a driving section 3. The body frames 2 are supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. An operator can sit on the driver's seat 31. Accordingly, the operator can ride in the driving section 3. The operator steers the left and right front wheels 10 by operating the steering wheel 32. The operator can perform various driving operations in the driving section 3.

The tractor includes a battery 4. The cover 12 is pivotable about an opening/closing axis Q extending in the left-right direction of the body. Accordingly, the cover 12 is openable and closable. When the cover 12 is closed, the battery 4 is covered by the cover 12.

Figure 2:
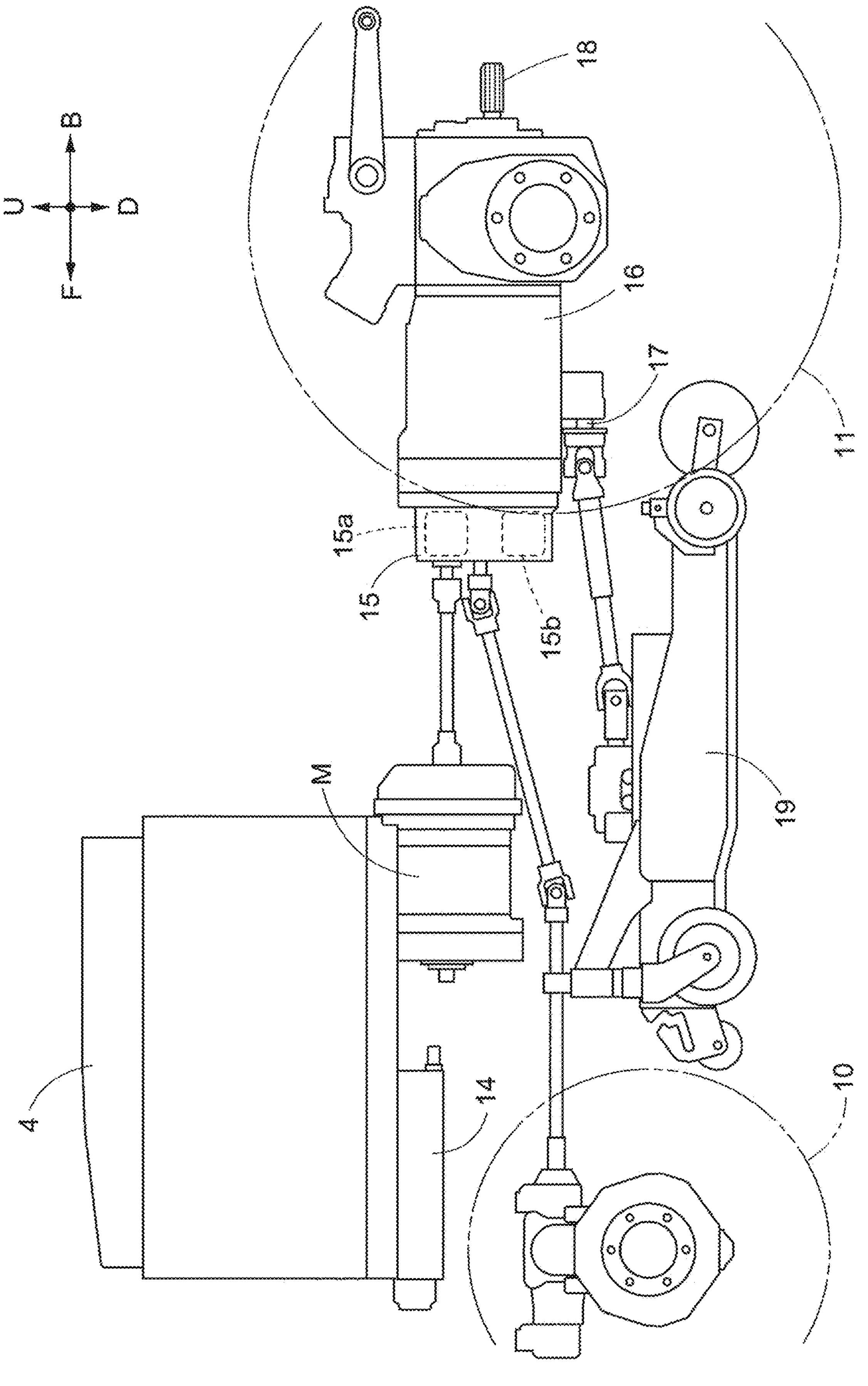

As shown in FIG. 2, the tractor includes an inverter 14 and a motor M. The battery 4 supplies power to the inverter 14. The inverter 14 converts DC power supplied from the battery 4 to AC power, and supplies the AC power to the motor M. The motor M is driven by the AC power supplied from the inverter 14.

Figure 3:
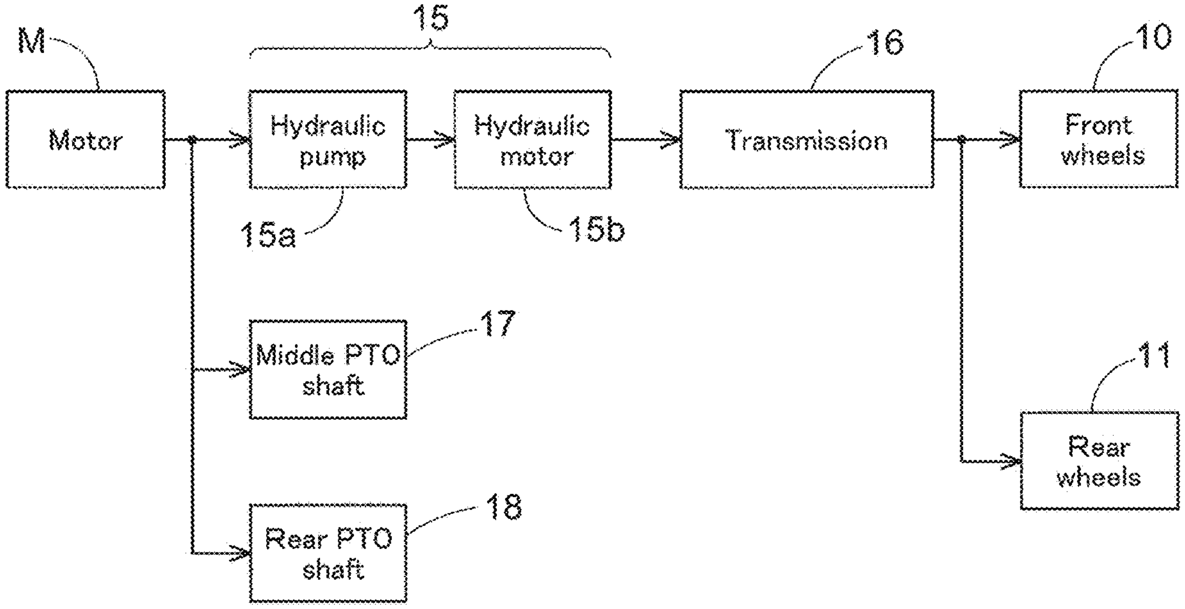
FIG. 3 is a diagram showing a flow of motive power transmission.

As shown in FIGS. 2 and 3, the tractor includes a hydraulic continuously variable transmission 15 and a transmission 16. As shown in FIG. 3, the hydraulic continuously variable transmission 15 includes a hydraulic pump **15*a* and a hydraulic motor 15*b***.

The hydraulic pump **15*a* is driven by rotational motive power transmitted from the motor M. As a result of the hydraulic pump 15*a* being driven, rotational motive power is output from the hydraulic motor 15*b*. The hydraulic continuously variable transmission 15 is configured to change the speed of rotational motive power between the hydraulic pump 15*a* and the hydraulic motor 15*b*. Also, the hydraulic continuously variable transmission 15** is capable of changing the transmission ratio in a stepless manner.

The rotational motive power output from the hydraulic motor **15*b* is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11** are driven.

As shown in FIGS. 2 and 3, the tractor also includes a middle PTO shaft 17 and a rear PTO shaft 18. Rotational motive power output from the motor M is distributed to the hydraulic pump **15*a*, the middle PTO shaft 17, and the rear PTO shaft 18. The middle PTO shaft 17 and the rear PTO shaft 18** are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 2. The grass cutting device 19 is driven by rotational motive power transmitted by the middle PTO shaft 17.

As shown in FIG. 1, the right and left body frames 2 and the transmission 16 are coupled to each other, and thus the body, serving as a framework of the tractor, includes the right and left portions of the body frame 2 and the transmission 16.

Figure 4:
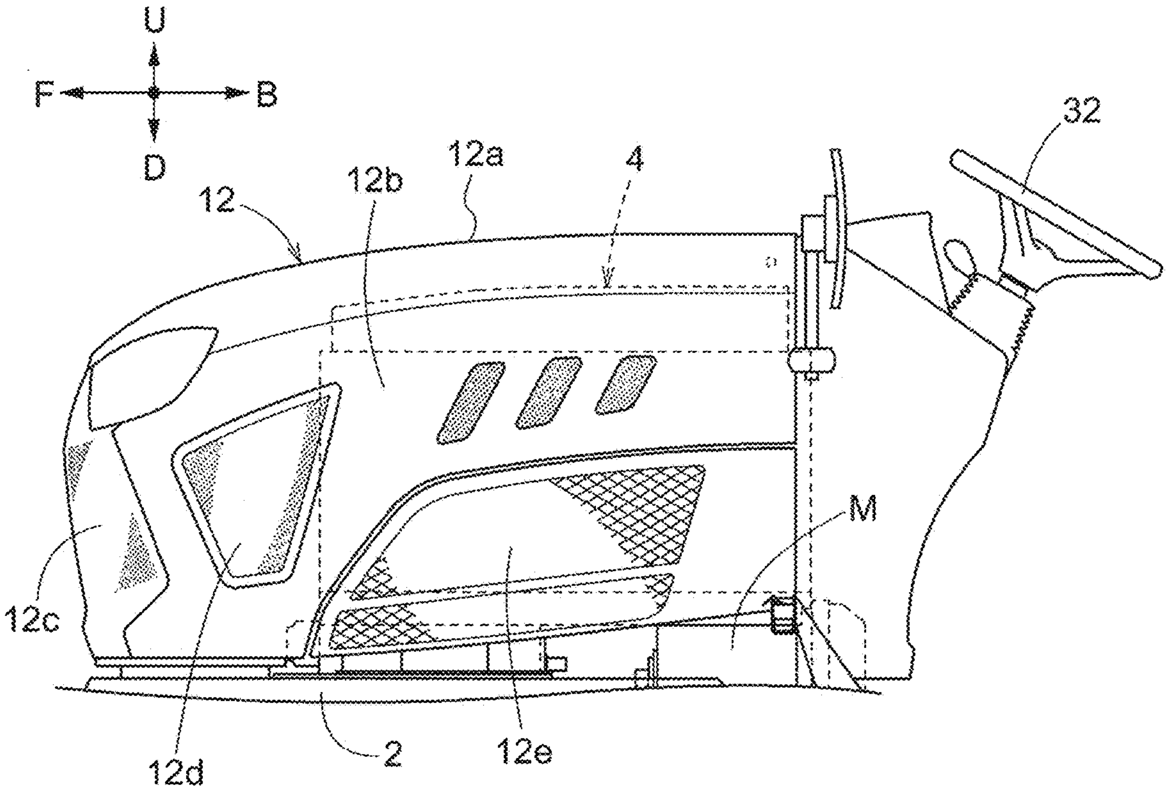
FIG. 4 is a left side view of the vicinity of a cover.
Figure 5:
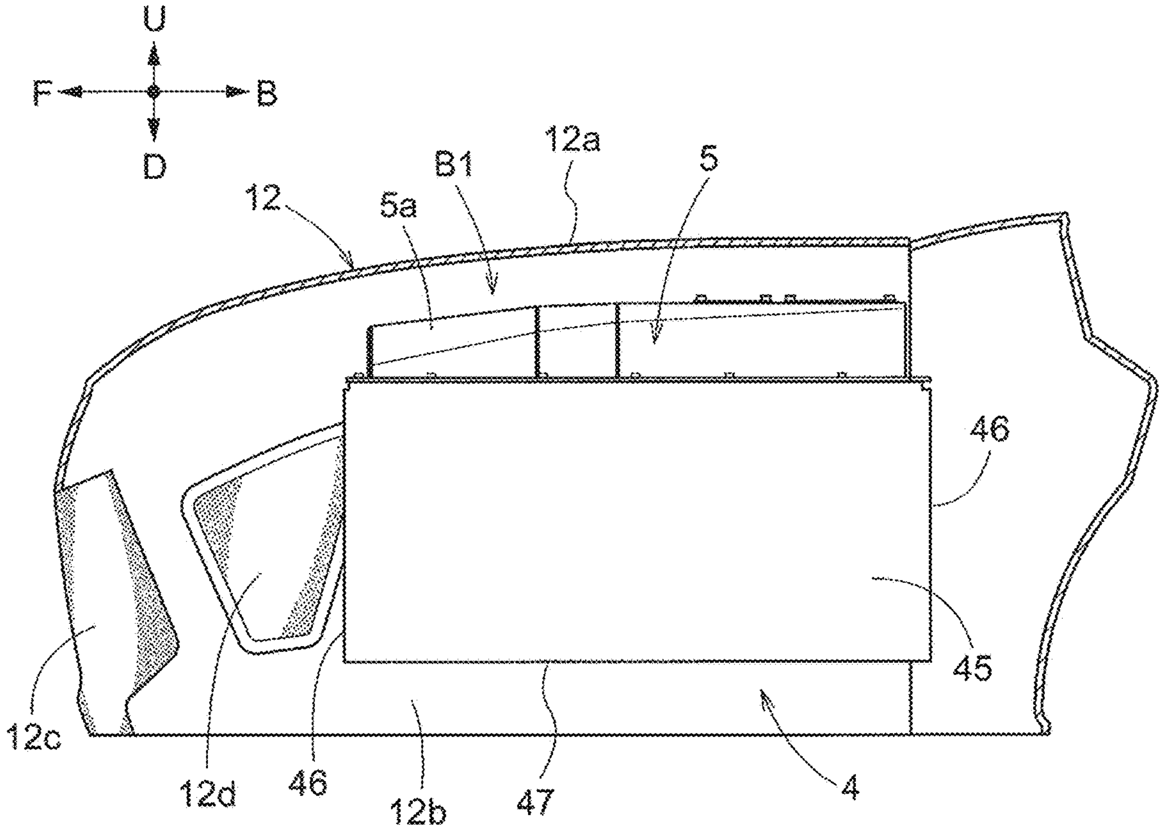
FIG. 5 is a longitudinal left side view of the vicinity of the cover.
Figure 6:
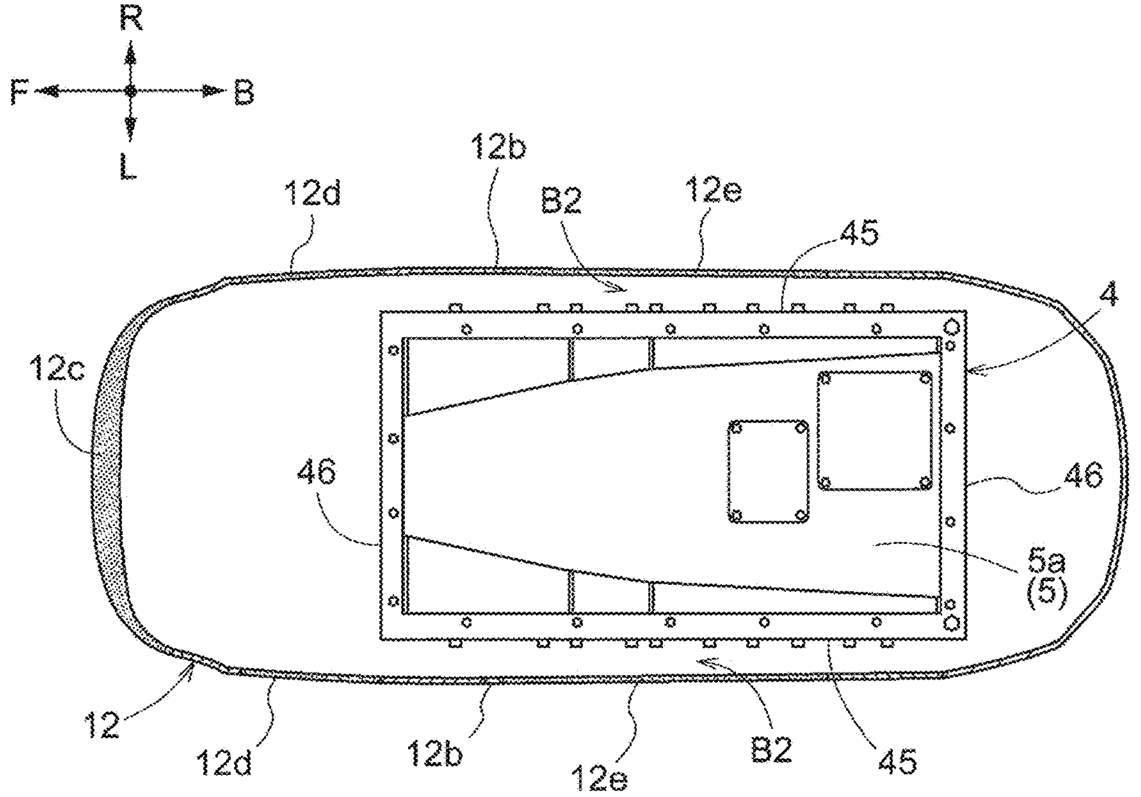
FIG. 6 is a horizontal plan view of the vicinity of the cover.

As shown in FIGS. 4, 5, and 6, the battery 4 (hereinafter, referred to as "battery 4") is installed in a front portion of the body, and the battery 4 is housed in the closed cover 12. A top surface 12*a* of the cover 12 preferably has a forward-descending shape in which it descends toward the front side when viewed in a side view, and side surfaces 12*b* of the cover 12 extend along a front-rear direction when viewed in a plan view.

A front grille 12*c*, which is grid-shaped with high ventilation performance and serves as an introduction section, is provided in the front portion of the cover 12, and side grilles 12*d* and 12*e*, which are grid-shaped with high ventilation performance, are provided at the right and left side surfaces 12*b* of the cover 12. As the body moves forward, air is introduced into the cover 12 mainly through the front grille 12*c* of the cover 12.

The battery 4 is provided with battery modules 6, a stack 7 (see FIGS. 11 and 12) in which a plurality of battery modules 6 (see FIGS. 11 and 12) are connected to each other, a housing case 1 (see FIGS. 7 and 8) in which a plurality of stacks 7 are housed, various devices (see FIG. 18) provided in an upper portion of the housing case 1, a housing cover 5 (see FIGS. 9 and 10) covering the top of the housing case 1 and the devices.

As shown in FIGS. 7 to 10, the housing case 1 is provided with horizontal frames 33, 34, 37, 38, and 39, vertical frames 35 and 36, upper frames 40 and 44, first lower frames 41, second lower frames 42, third lower frames 43, side plates 45 and 46, a bottom plate 47, and the like to form a rectangular (quadrangle-shaped) box shape when viewed in a plan view.

Figure 7:
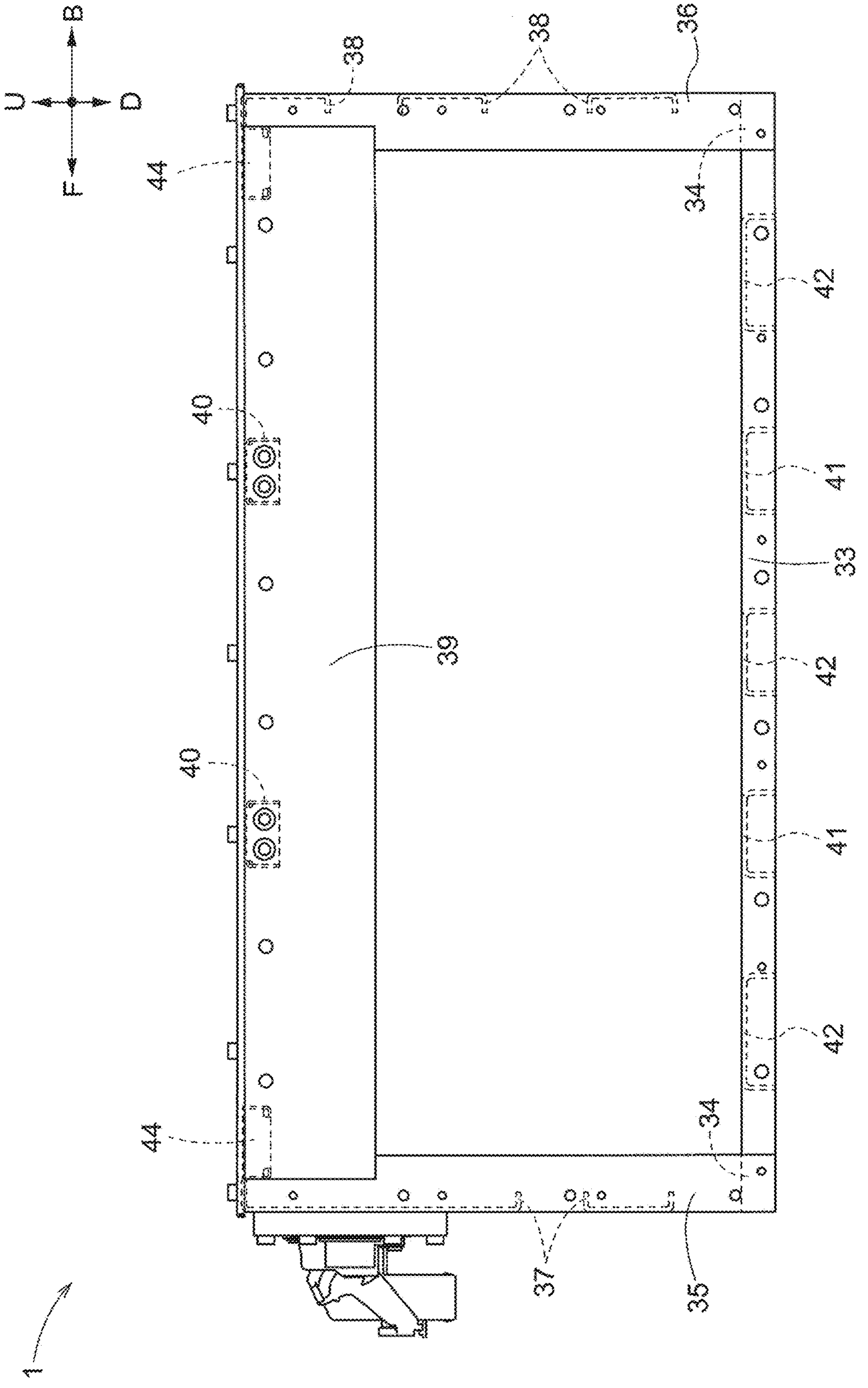
FIG. 7 is a left side view of a housing case.
Figure 8:
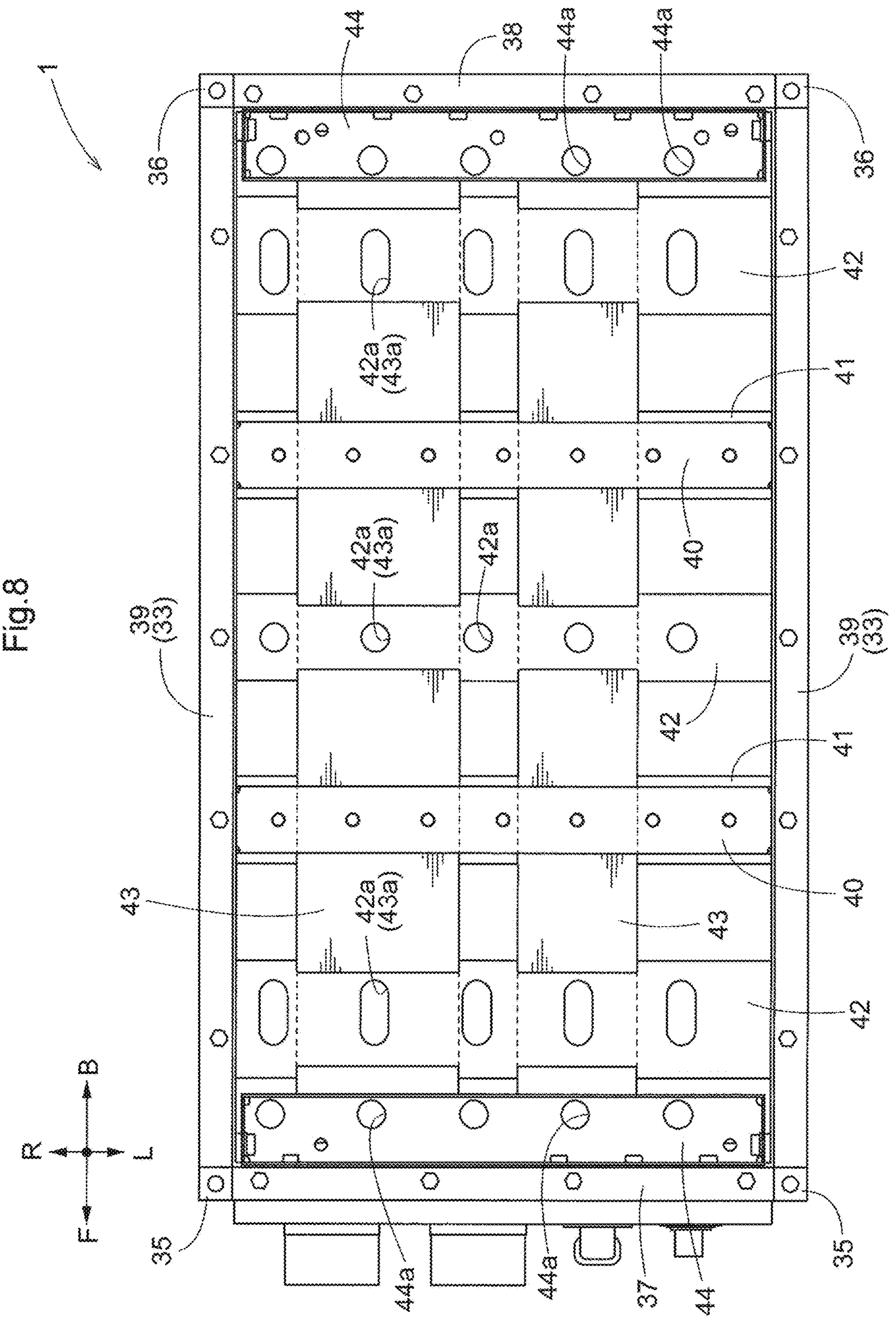
FIG. 8 is a plan view of the housing case.

As shown in FIGS. 7 and 8, the right and left horizontal frames 33 located at the bottom of the housing case 1, and the front and rear horizontal frames 34 are coupled in a rectangular shape, and the front vertical frames 35 and rear vertical frames 36 are coupled to the ends of the horizontal frames 33 and 34. The front horizontal frame 37 is coupled to the vertical frames 35 while spanning the space therebetween, and the rear horizontal frame 38 is coupled to the vertical frames 36 while spanning the space therebetween. The right and left horizontal frames 39 are coupled to upper portions of the vertical frames 35 and 36 while spanning the spaces therebetween.

Two first lower frames 41 are coupled to the horizontal frames 33 while spanning the space therebetween along a left-right direction. Three second lower frames 42 are parallel or substantially parallel to the first lower frames 41 when viewed in a plan view and are coupled to the horizontal frames 33 while spanning the space therebetween along the left-right direction. Large openings 42*a* are formed in the second lower frames 42.

Two third lower frames 43 are perpendicular or substantially perpendicular to the first lower frames 41 and the second lower frames 42 when viewed in a plan view and are coupled to the horizontal frames 34 while spanning the space therebetween along the front-rear direction and are coupled to the first lower frames 41 and the second lower frames 42. At each position at which a second lower frame 42 and a third lower frame 43 are coupled to each other, an opening 43*a* as large as the openings 42*a* in the second lower frames 42 is formed in the third lower frame 43.

Two upper frames 40 are coupled to the horizontal frames 39 while spanning the space therebetween along the left-right direction. Two upper frames 44 are coupled to the horizontal frames 37, 38, and 39 along the left-right direction. Large openings 44*a* are formed in the upper frames 44.

Figure 9:
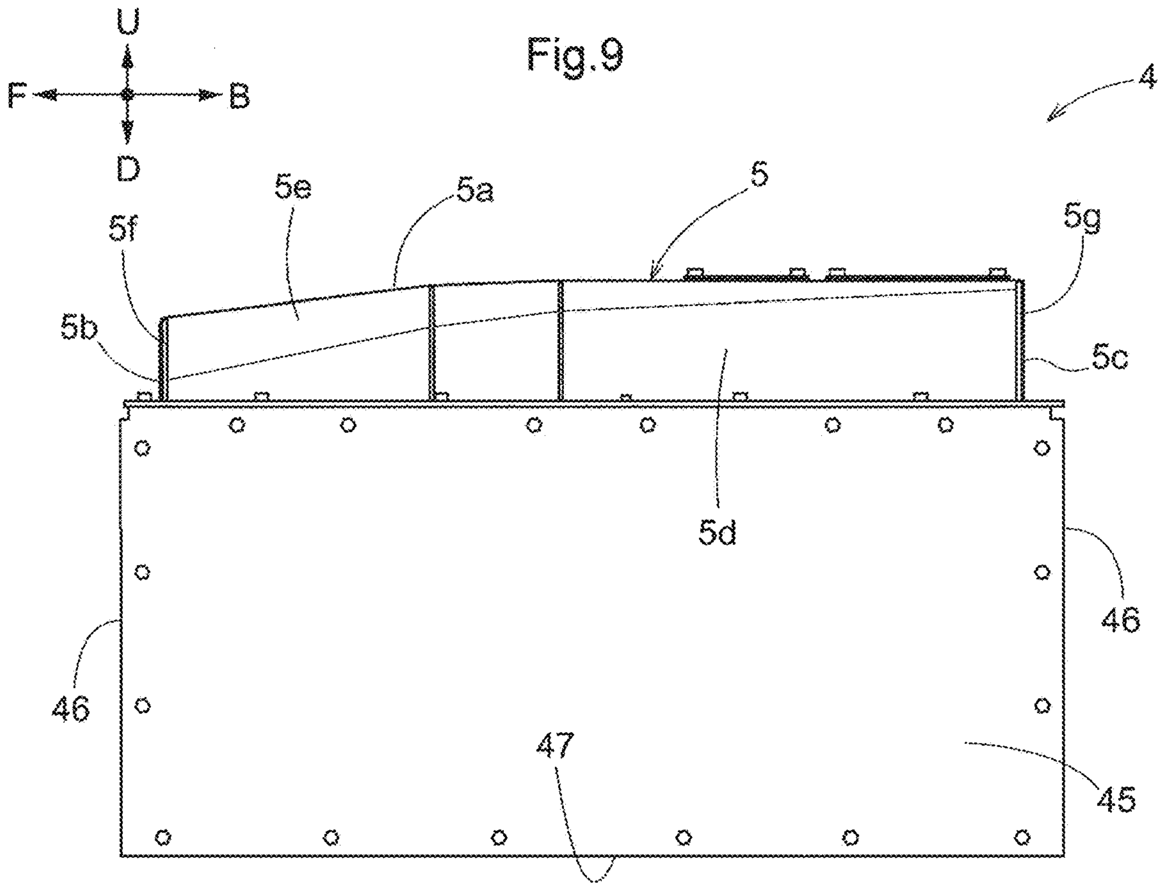
FIG. 9 is a left side view of a battery.
Figure 10:
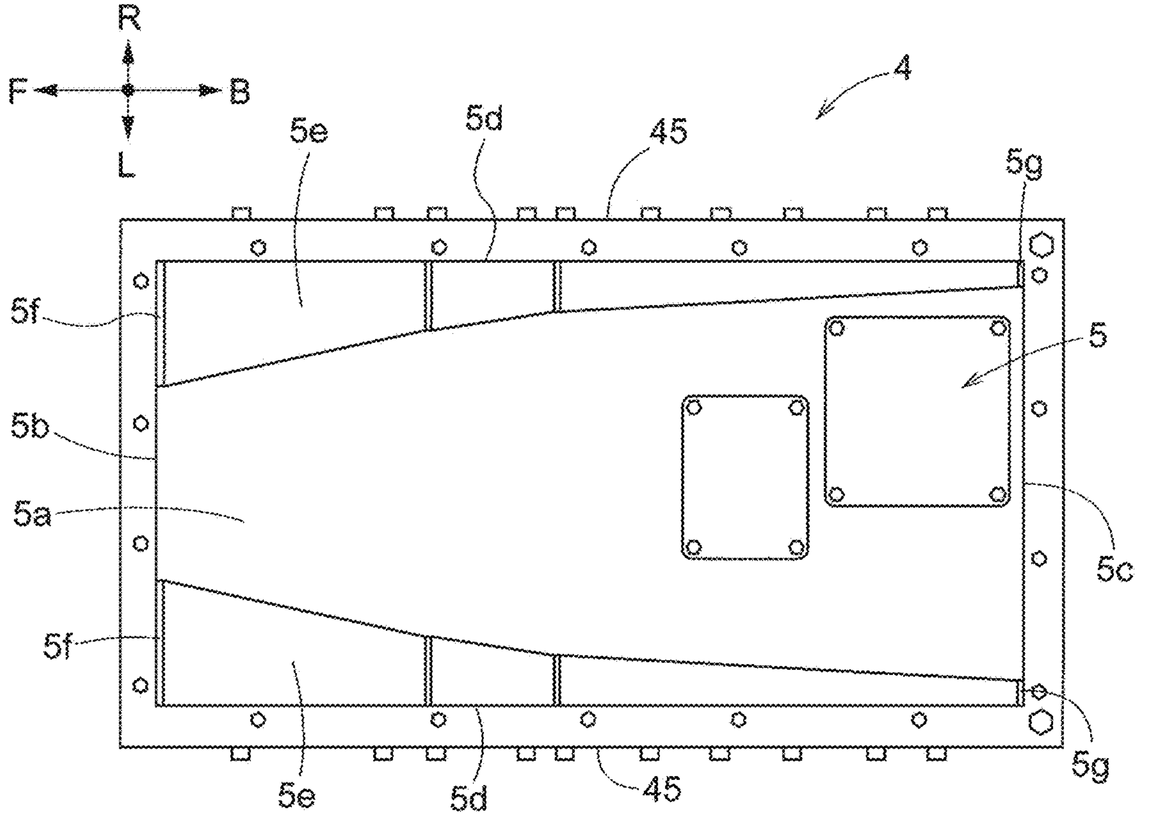
FIG. 10 is a plan view of the battery.

As shown in FIGS. 9 and 10, the right and left side plates 45 in a flat plate shape are coupled to the horizontal frames 33 and 39 and the vertical frames 35 and 36. The front and rear side plates 46 in a flat plate shape are coupled to the horizontal frames 34, 37, and 38, and the vertical frames 35 and 36. The bottom plate 47 in a flat plate shape is coupled to the horizontal frames 33 and 34.

Figure 11:
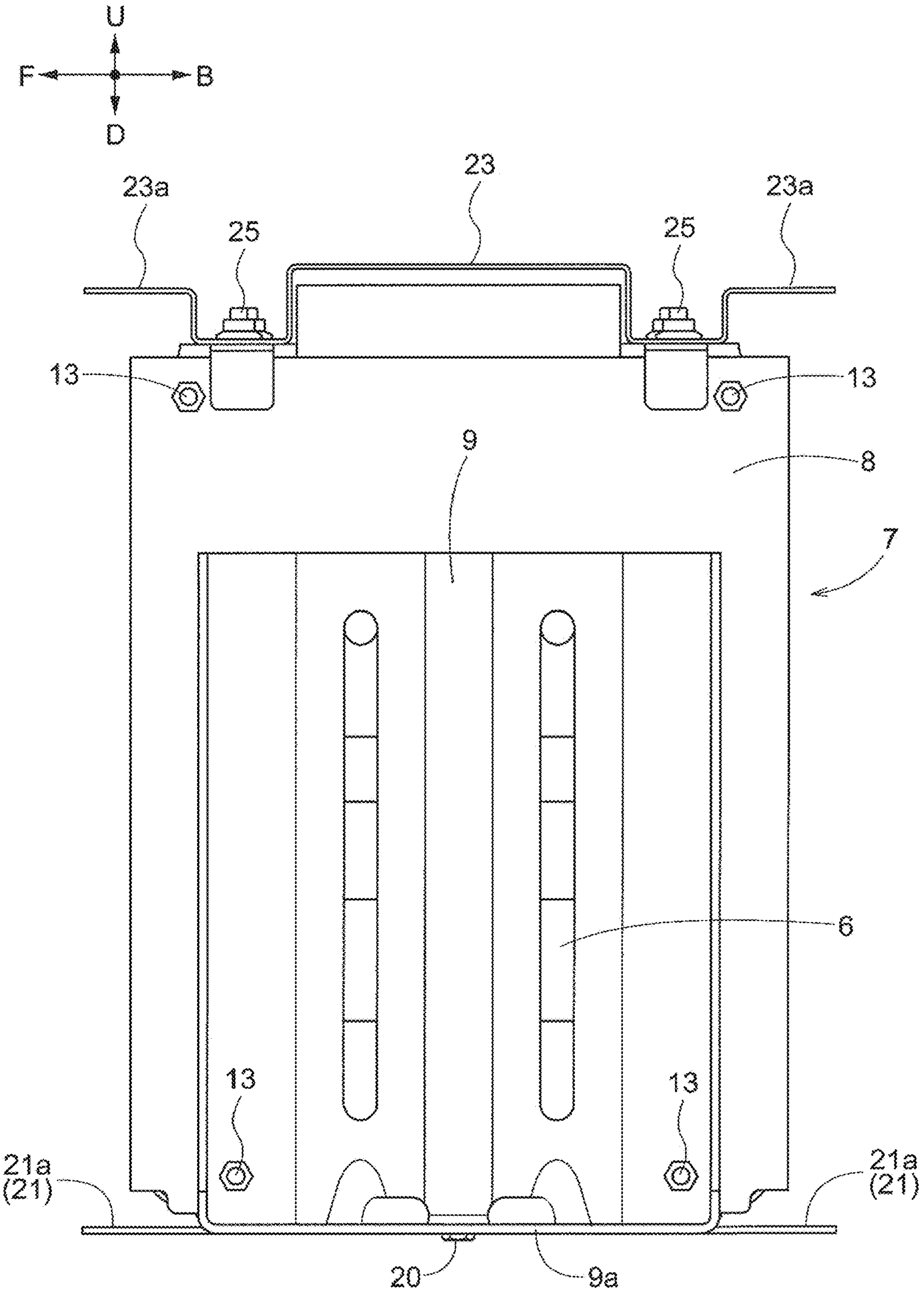
FIG. 11 is a left side view of stacks, a lower support, and an upper support.
Figure 12:
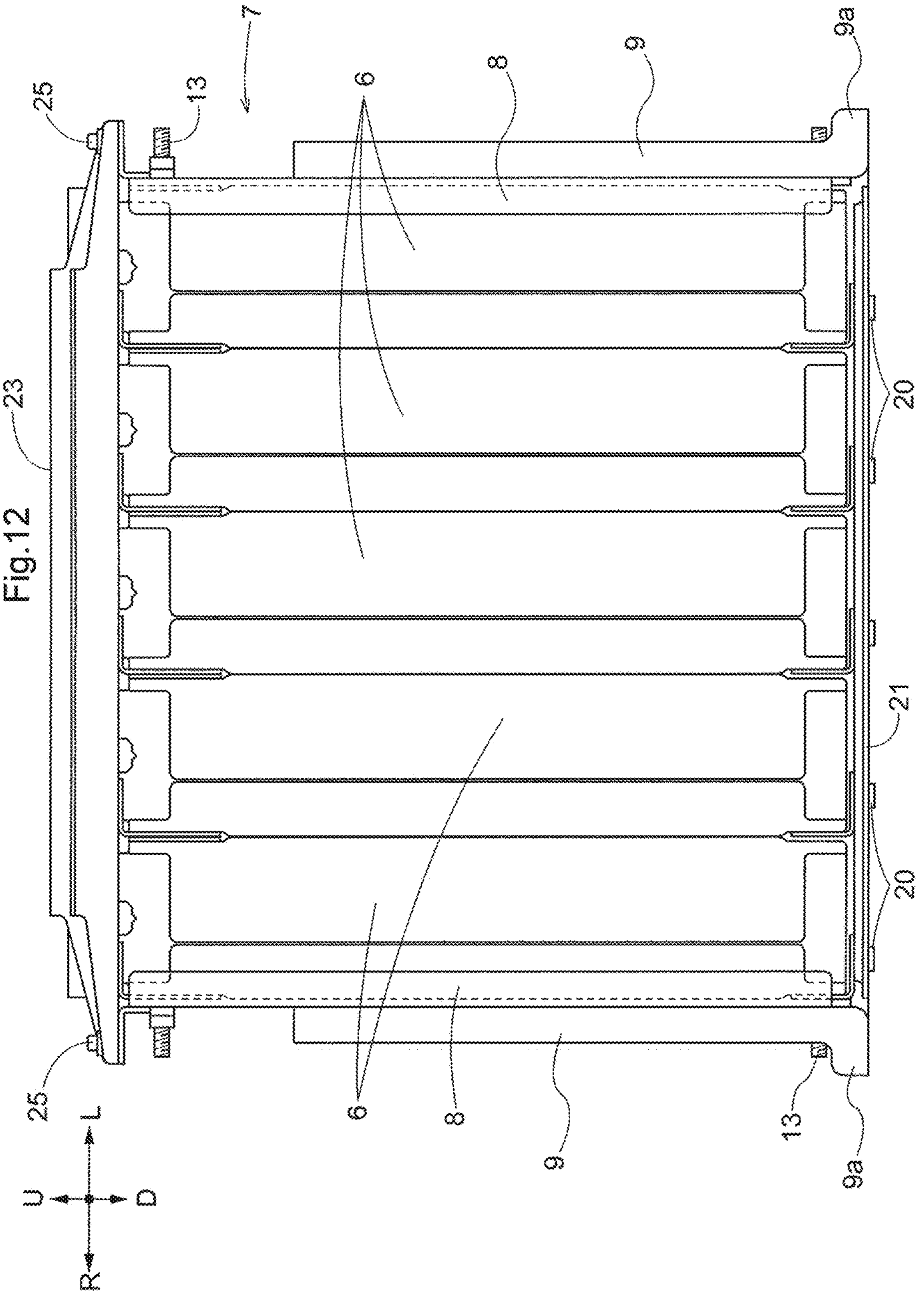
FIG. 12 is a front view of the stacks, the lower support, and the upper support.

As shown in FIGS. 11 and 12, for example, five battery modules 6 are stacked and five battery modules 6 are coupled to each other while being aligned adjacent to each other, thereby defining one stack 7. Three stacks 7 are provided in the battery 4, for example.

A flat plate-shaped coupling member 8 and a coupling member 9 with a mounting portion 9*a* are provided, and the coupling member 8 and the coupling member 9 are coupled to each other. The coupling members 8 and 9 are attached to one side and another side of the stack 7 (battery modules 6), and four bolts 13 are passed through the coupling members 8 and 9 on one side, the battery modules 6, and the coupling members 8 and 9 on the other side to tighten them.

With this, the five battery modules 6 are coupled to each other while being compressed by the coupling members 8 and 9 and the bolts 13.

As shown in FIGS. 11 to 14, the lower supports 21 and 22 are provided.

Figure 13:
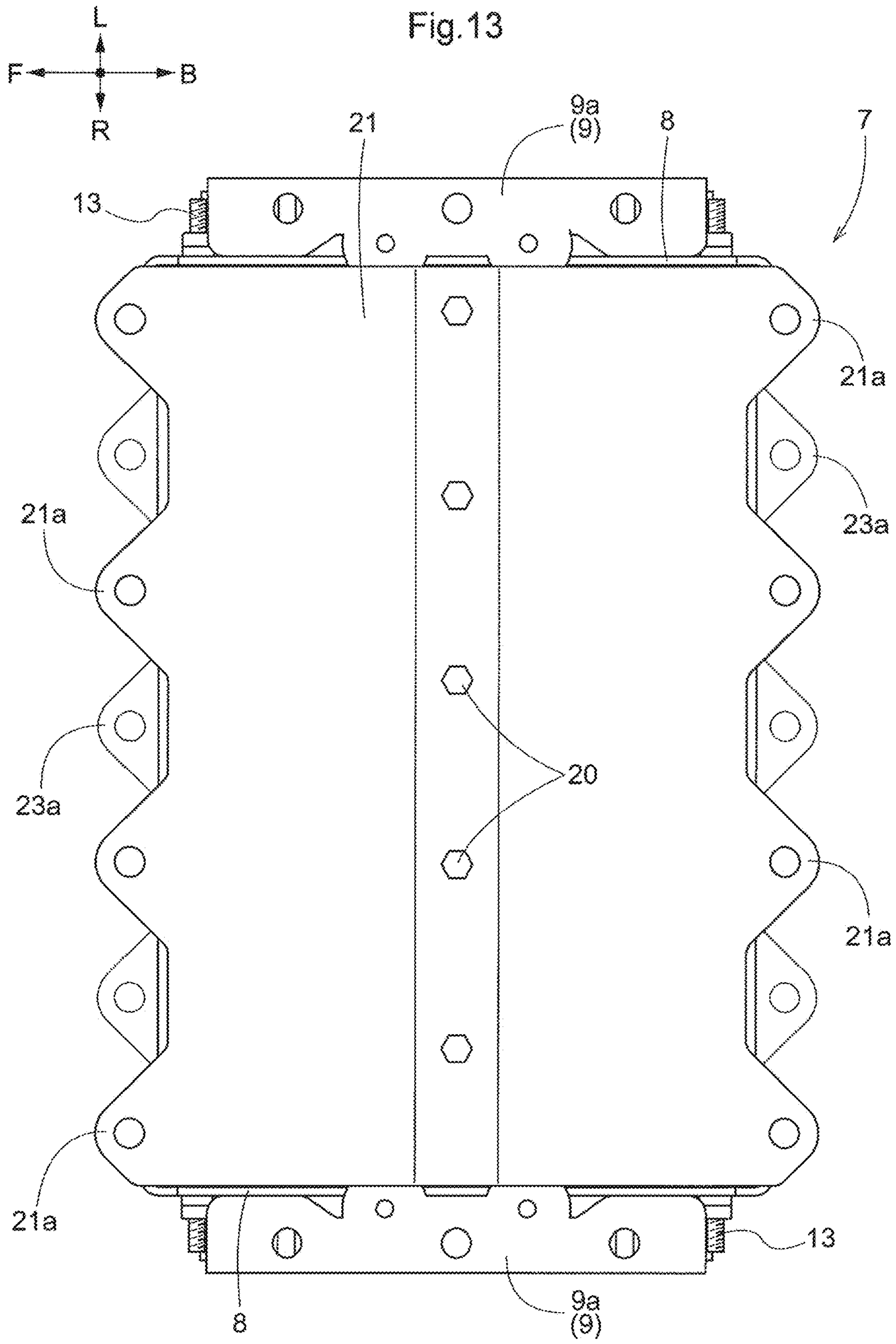
FIG. 13 is a bottom view of the stacks, the lower support, and the upper support.

As shown in FIGS. 11, 12, and 13, the lower support 21 is flat plate shaped, and four coupling portions 21*a* protruding outward are provided at each of one edge and another edge of the lower support 21, while being aligned and spaced at a predetermined distance. When viewed in a plan view, the coupling portions 21*a* of the lower support 21 are triangle-shaped and tapered with their width decreasing away from the lower support 21.

Figure 14:
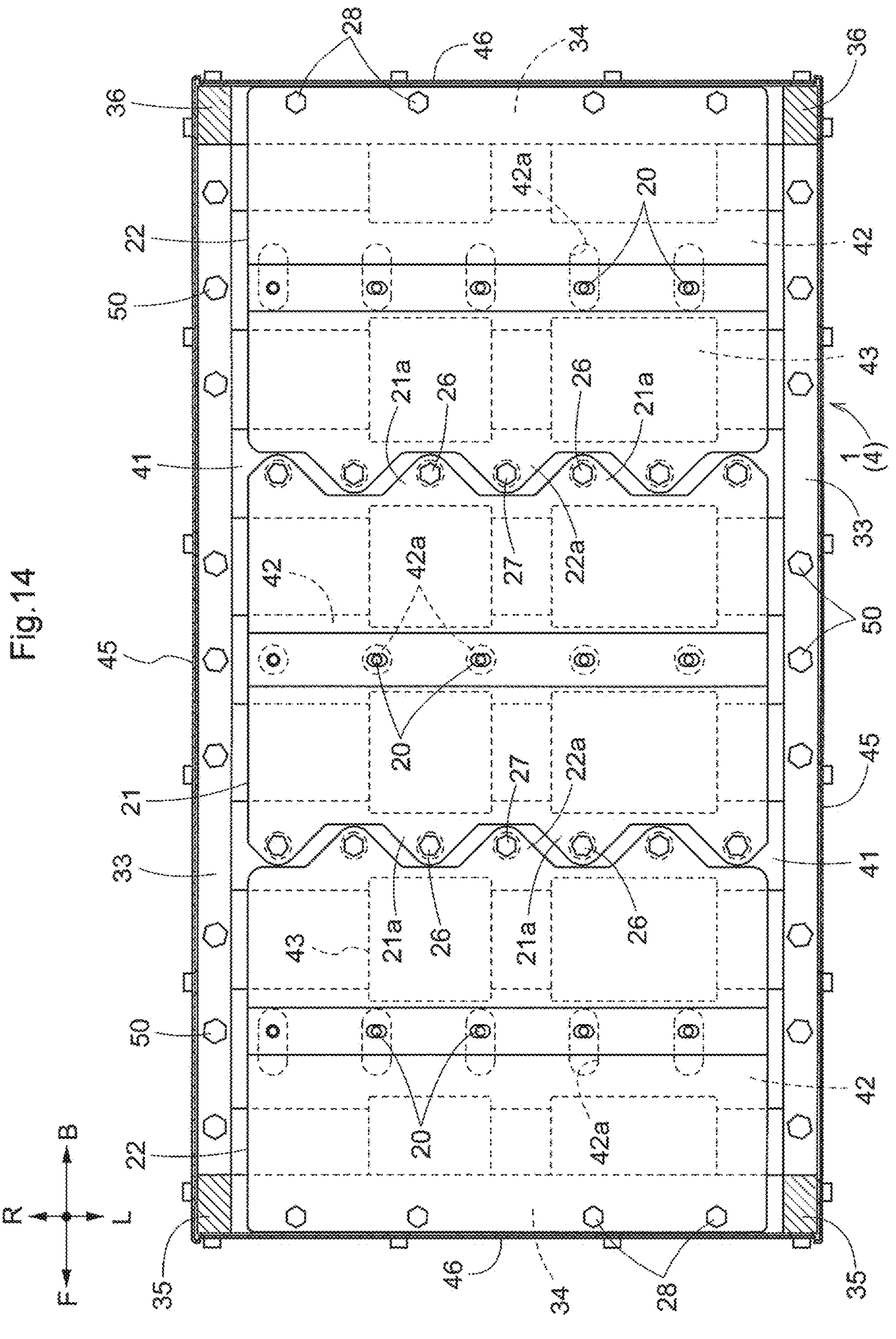
FIG. 14 is a longitudinal plan view of the vicinity of the lower support in the housing case.

As shown in FIG. 14, the lower supports 22 are flat plate shaped, and three coupling portions 22*a* protruding outward are provided at one edge of each lower support 22, while being aligned and spaced at a predetermined distance. When viewed in a plan view, the coupling portions 22*a* of the lower supports 22 are triangle-shaped and tapered with their width decreasing away from the corresponding lower support 22.

As shown in FIGS. 11, 12, and 13, in one stack 7 of the three stacks 7, the lower support 21 is coupled to lower central portions of the battery modules 6 by bolts 20.

As shown in FIG. 14, in two stacks 7 of the three stacks 7, the lower supports 22 are coupled to lower central portions of the battery modules 6 by the bolts 20.

As shown in FIGS. 11, 12, 15, and 16, the upper supports 23 and 24 are provided.

Figure 15:
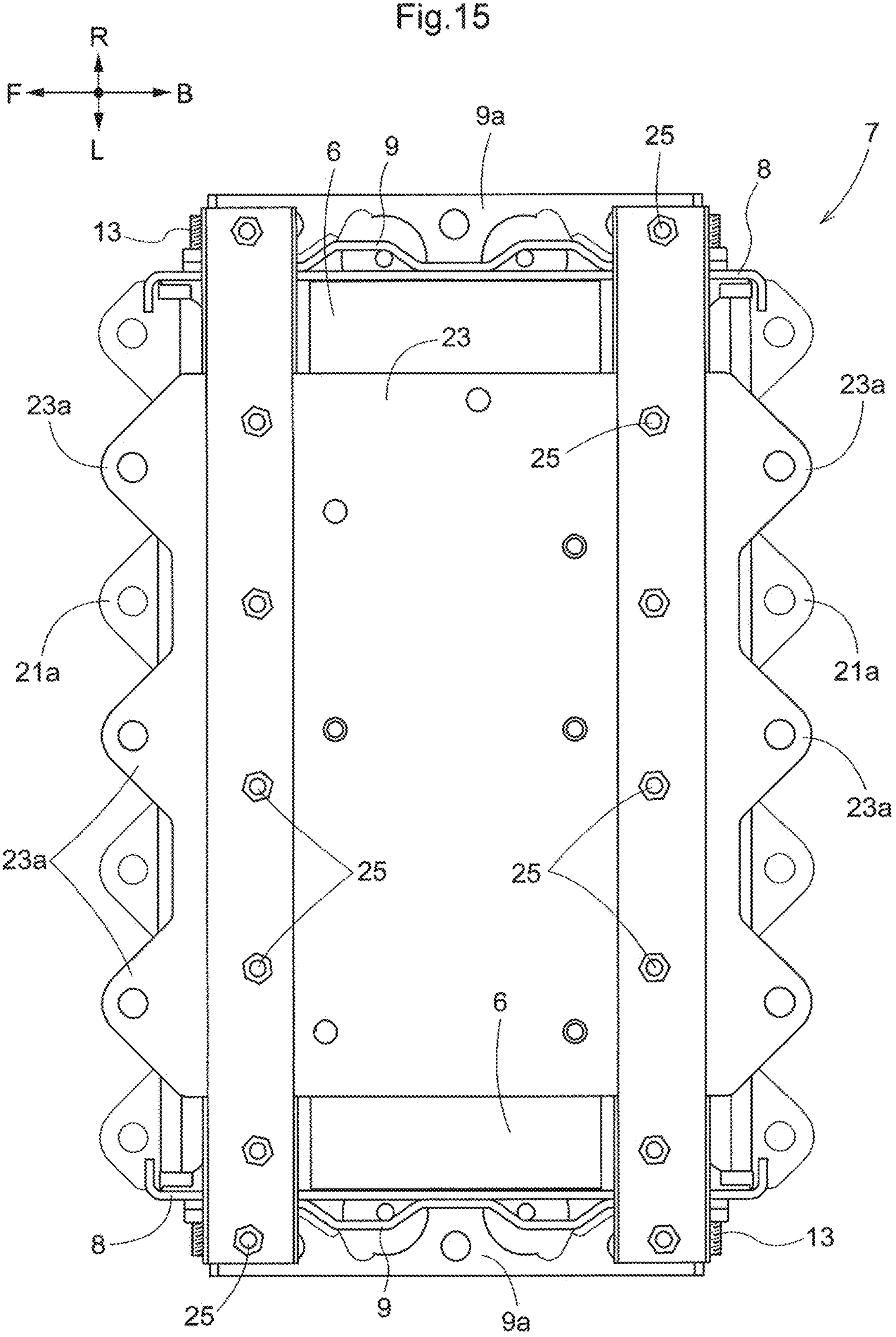
FIG. 15 is a plan view of the stacks, the lower support, and the upper support.

As shown in FIGS. 11, 12, and 15, the upper support 23 is formed by bending a plate material, and three coupling portions 23*a* protruding outward are provided at each of one edge and another edge of the upper support 23, while being aligned and spaced at a predetermined distance. When viewed in a plan view, the coupling portions 23*a* of the upper support 23 are triangle-shaped and tapered with their width decreasing away from the upper support 23.

Figure 16:
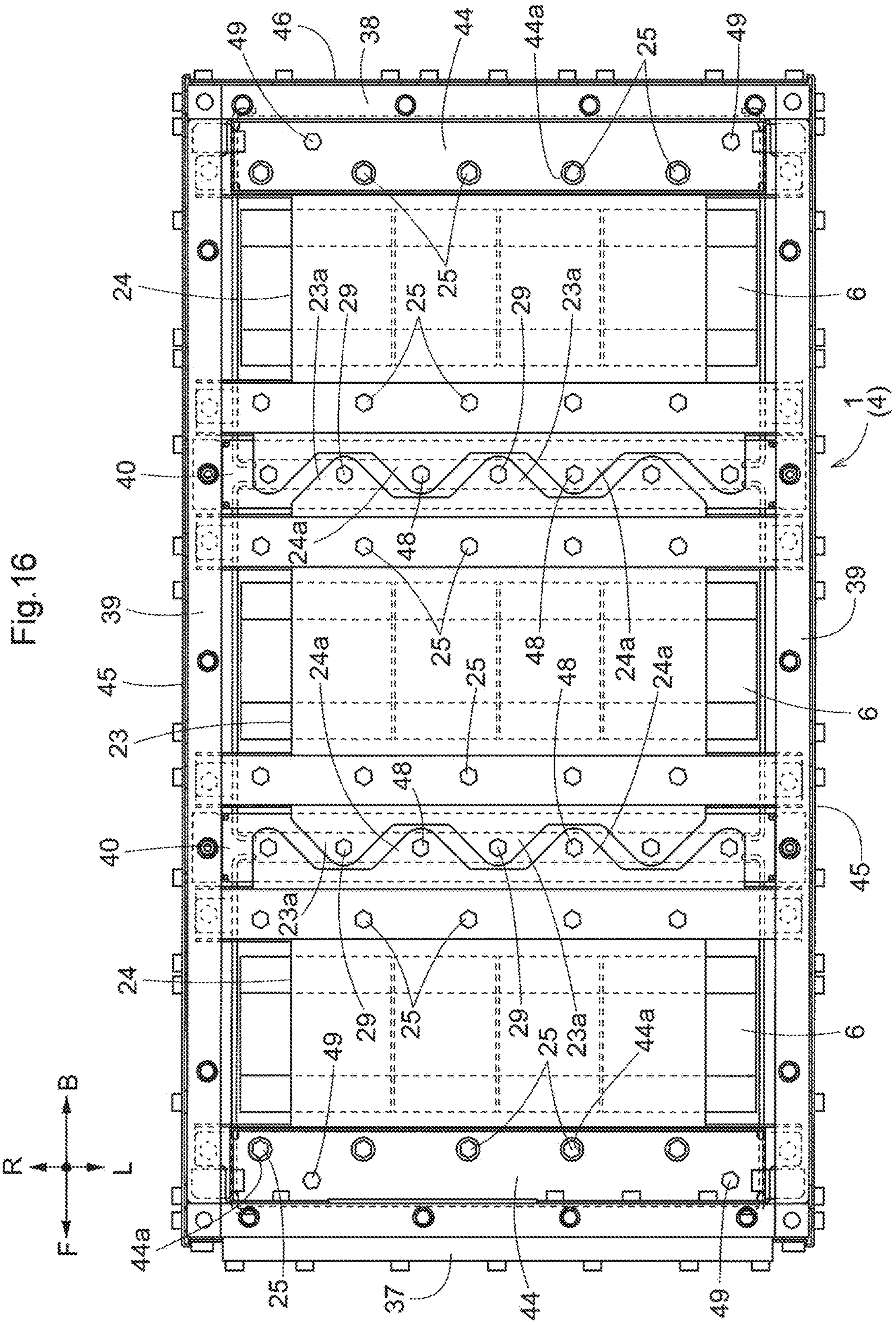
FIG. 16 is a plan view of the vicinity of the upper support in the housing case.

As shown in FIG. 16, the upper supports 24 are formed by bending a plate material, and three coupling portions 24*a* protruding outward are provided at one edge of each of the upper supports 24, while being aligned and spaced at a predetermined distance. When viewed in a plan view, the coupling portions 24*a* of the upper supports 24 are triangle-shaped and tapered with their width decreasing away from the corresponding upper support 24.

As shown in FIGS. 11, 12, and 15, in one stack 7 to which the lower support 21 is coupled, among the three stacks 7, the upper support 23 is coupled to upper portions of the battery modules 6 by bolts 25, so that the upper support 23 is coupled to upper portions of the coupling members 8 by the bolts 25.

As shown in FIG. 16, in each of two stacks 7 to which the lower support 22 is coupled, among the three stacks 7, the corresponding upper support 24 is coupled to upper portions of the battery modules 6 by the bolts 25, so that the upper support 24 is coupled to upper portions of the coupling members 8 by the bolts 25.

As described above, the stacks 7 (battery modules 6) are combined with the coupling members 8 and 9, the lower supports 21 and 22, and the upper supports 23 and 24 into one piece to serve as one unit.

As shown in FIG. 14, in a state in which the upper frames 44 (see FIG. 16) of the housing case 1 are removed, the stack 7 to which the lower support 21 and the upper support 23 are coupled is installed in a central portion of the housing case 1. The stacks 7 to which the lower supports 22 and the upper supports 24 are coupled are respectively placed in a front portion and a rear portion of the housing case 1.

In the stack 7 to which the lower support 21 and the upper support 23 are coupled, the coupling portions 21*a* of the lower support 21 are placed on the first lower frame 41 and are coupled to the first lower frame 41 by bolts 26. The central portion of the lower support 21 is placed on the second lower frame 42, and the bolts 20 are positioned in the openings 42*a* and 43*a* in the second lower frame 42 and the third lower frame 43.

In the stacks 7 to which the lower supports 22 and the upper supports 24 are coupled, the coupling portions 22*a* of the lower support 22 are placed on the first lower frames 41 and are coupled to the first lower frames 41 by bolts 27. Another edge of each lower support 22 is placed on the corresponding horizontal frame 34 and are coupled to the horizontal frame 34 by bolts 28. The central portions of the lower supports 22 are placed on the respective second lower frames 42 and the bolts 20 are positioned in the openings 42*a* and 43*a* in the second lower frame 42 and the third lower frame 43.

Figure 17:
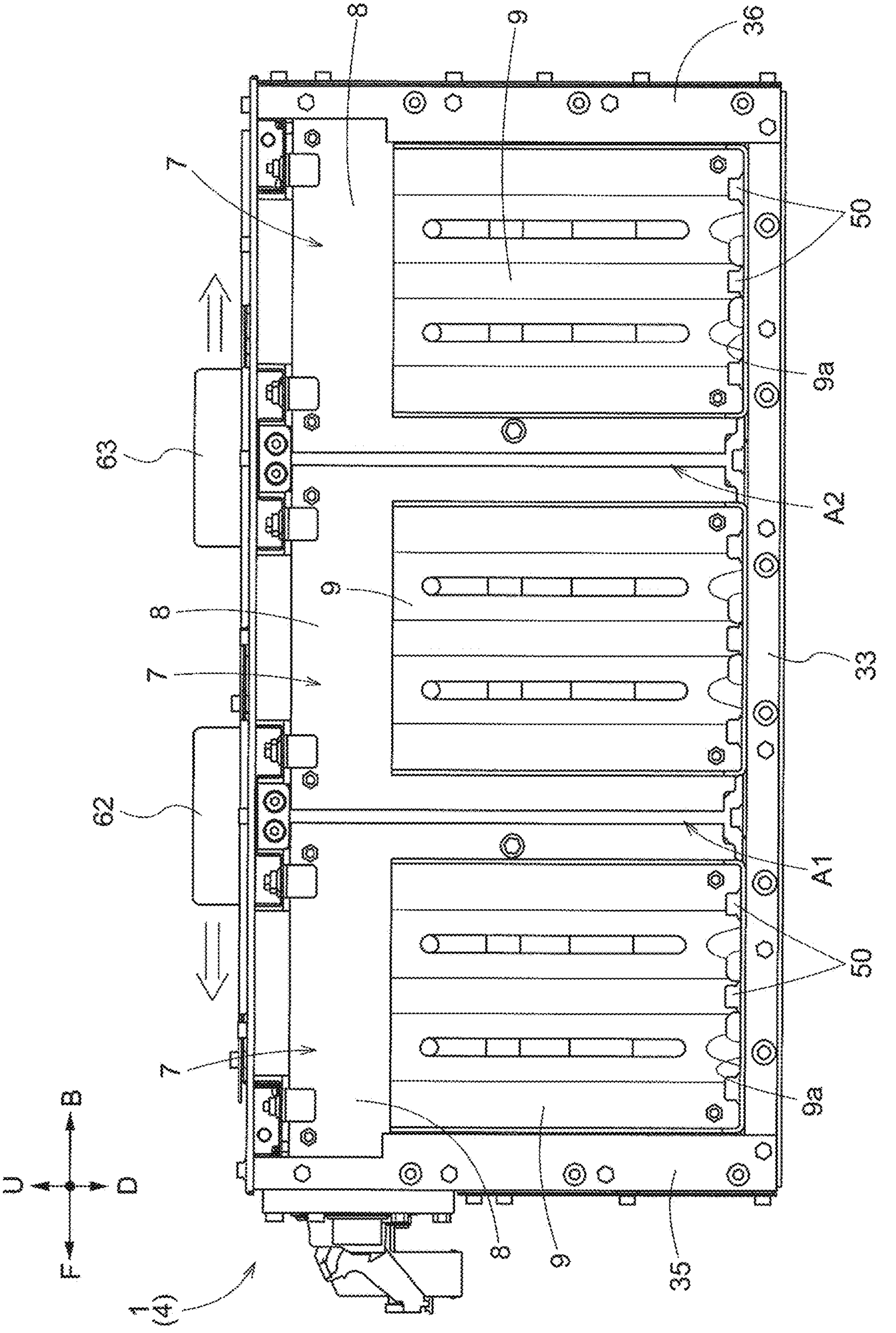
FIG. 17 is a left side view of the housing case and the stacks, as well as the vicinity of a fan.

In the stack 7 to which the lower support 21 and the upper support 23 are coupled, and the stacks 7 to which the lower support 22 and the upper support 24 are coupled, as shown in FIG. 17, the mounting portions 9*a* of the coupling members 9 are coupled to the horizontal frames 33 by bolts 50.

With the above-described configuration, in the battery 4, the stacks 7 in which a plurality of battery modules 6 are coupled to each other are aligned adjacent to each other and are housed in the housing case 1. The plurality of lower supports 21 and 22 coupled to the lower portions of the battery modules 6, and the first lower frames 41 disposed along the spaces between the adjacent lower supports 21 and 22 are provided in the housing case 1.

In the adjacent lower supports 21 and 22, the coupling portions 21*a* of one lower support 21 enter the respective spaces between the coupling portions 22*a* of the other lower support 22, and the coupling portions 22*a* of the other lower support 22 enter the respective spaces between the coupling portions 21*a* of the one lower support 21. The coupling portions 21*a* and 22*a* of the one lower support 21 and the other lower support 22 are coupled to the first lower frame 41.

The coupling portions 21*a* of the lower support 21 are supported by the first lower frame 41 and the third lower frame 43 from below, and connections (near the bolts 20) of the lower support 21 to the battery modules 6 are supported by the second lower frame 42 and the third lower frame 43 from below.

The central stack 7 (battery modules 6) is considered to more easily vibrate than the front and rear stacks 7 (battery module 6). On each of the first lower frames 41, the number (four) of coupling portions 21*a* of the lower support 21 is set to be larger than the number (three) of coupling portions 22*a* of the lower support 22, so that the central stack 7 (battery module 6) is firmly coupled to the first lower frames 41.

As described above, when the stack 7 to which the lower support 21 and the upper support 23 are coupled is installed in a central portion of the housing case 1, as shown in FIG. 16, the coupling portions 23*a* of the upper support 23 are placed on the upper frames 40 and are coupled to the upper frames 40 by bolts 29.

As described above, when the stacks 7 to which the lower support 22 and the upper support 24 are coupled are respectively installed in a front portion and a rear portion of the housing case 1, the coupling portions 24*a* of the upper supports 24 are placed on the upper frames 40 and are coupled to the upper frames 40 by bolts 48.

The upper frame 44 is placed on another edge of each upper support 24 from above, and the bolts 25 of the upper supports 24 are inserted into the respective openings 4*a* in the upper frame 44. The upper frames 44 are bolted to the horizontal frames 37 and 39, and the upper frames 44 and the upper supports 24 are coupled to each other by bolts 49.

With the above-described configuration, in the battery 4, the plurality of upper supports 23 and 24 coupled to the upper portions of the battery modules 6 and the upper frames 40 disposed along the space between adjacent upper supports 23 and 24 are provided in the housing case 1.

In the adjacent upper supports 23 and 24, the coupling portions 23*a* of one upper support 23 enter the respective spaces between the coupling portions 24*a* of the other upper support 24, and the coupling portions 24*a* of the other upper support 24 enter the respective spaces between the coupling portions 23*a* of the one upper support 23. The coupling portions 23*a* and 24*a* of the one upper support 23 and the other upper support 24 are coupled to the upper frames 40.

As described above, three stacks 7 (battery modules 6) are housed in the housing case 1 via the lower supports 21 and 22, the upper supports 23 and 24, and the coupling members 8 and 9, are coupled to the housing case 1, and are aligned in the front-rear direction (horizontal direction).

Figure 18:
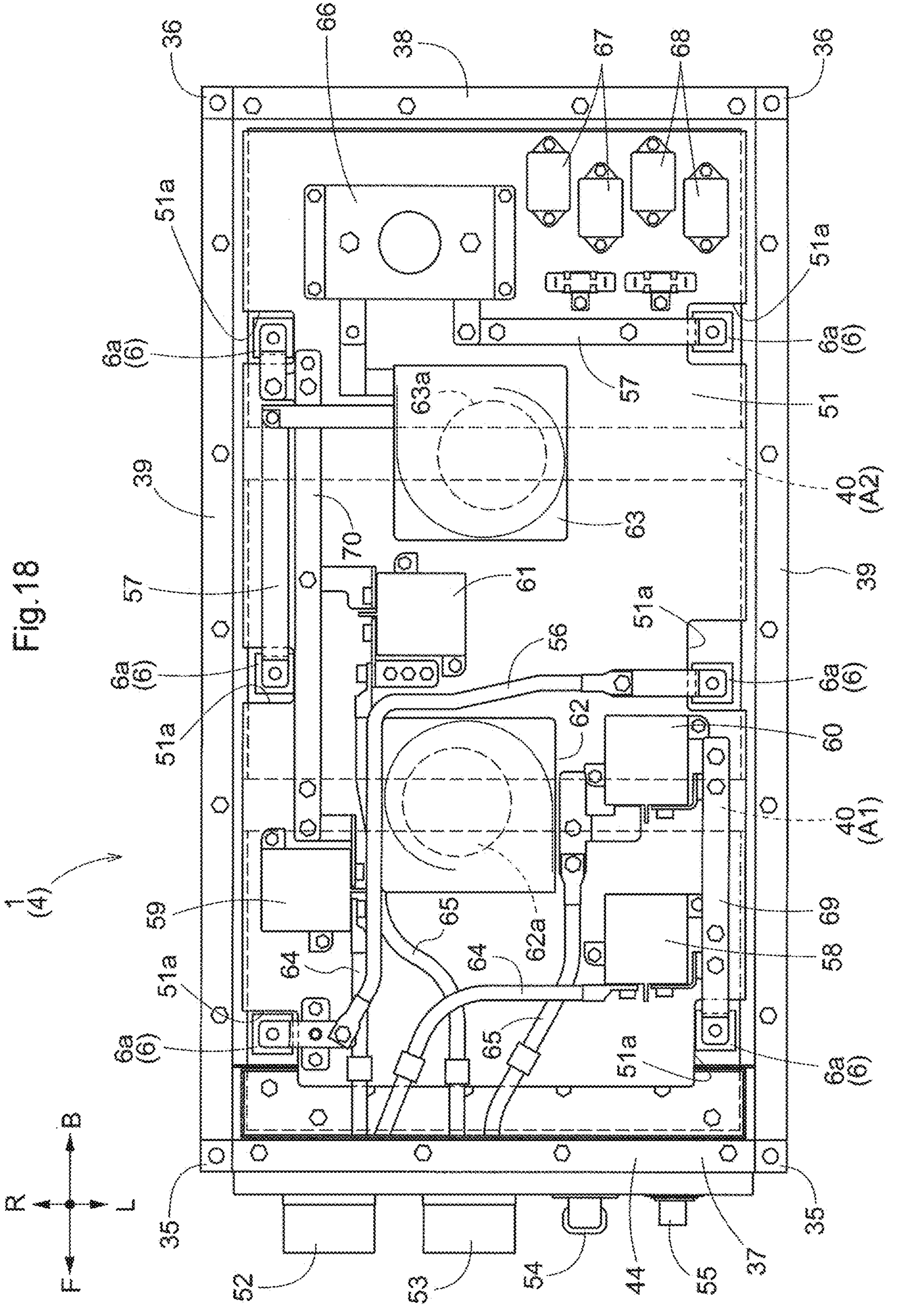
FIG. 18 is a plan view of the vicinity of a substrate and the fan in the housing case.

As shown in FIG. 18, a substrate 51 in a rectangular shape (quadrangle shape) when viewed in a plan view is coupled to the upper supports 23 and 24 (see FIG. 16), and the top of the housing case 1 is covered by the substrate 51. Connection portions 52, 53, 54, and 55 are provided on the front horizontal frame 37.

The connection portion 52 is provided to charge the battery modules 6 with power supplied from an external power source (not shown). The connection portion 53 is to supply power from the battery modules 6 to the inverter 14 (see FIG. 2). The connection portion 54 is provided to supply power from the battery modules 6 to a DC-DC converter (not shown), and power stepped down to 12 V by the DC-DC converter is supplied to another battery (not shown). The connection portion 55 is for being supplied with power from the above-described other battery.

In three stacks 7, five battery modules 6 are connected in series to each other. Openings 51*a* are formed in the substrate 51 (housing case 1) at positions above the terminals 6*a* of the battery modules 6 at the right and left ends of the stacks 7.

A harness 56 is connected between the terminal 6*a* (minus) of the battery module 6 at the right end of the front stack 7 and the terminal 6*a* (plus) of the battery module 6 at the left end of the central stack 7. A flat plate-shaped connector 57 is connected between the terminal 6*a* (minus) of the battery module 6 at the right end of the central stack of 7 and the terminal 6*a* (plus) of the battery module 6 at the left end of the rear stack 7.

Relay switches 58, 59, 60, and 61 are provided on the substrate 51. A flat plate-shaped connector 69 is connected between the terminal 6*a* (plus) of the battery module 6 at the left end of the front stack 7 and the relay switches 58 and 60. A flat plate-shaped connector 70 is connected between the terminal 6*a* (minus) of the battery module 6 at the right end of the rear stack 7 and the relay switches 59 and 61.

Harnesses 64 are connected between the relay switches 58 and 59, and the connection portion 52, and the relay switches 58 and 59 function when the battery modules 6 are charged with power supplied from the external power source.

Harnesses 65 are connected between the relay switches 60 and 61, and the connection portion 53, and the relay switches 60 and 61 function when power is supplied from the battery modules 6 to the inverter 14.

A shut-off portion 66 is provided in a mid-way portion of the connector 57. When performing a maintenance operation for the battery 4, an operator brings the shut-off portion 66 into a shut-off state.

As shown in FIG. 18, pre-charge portions 67 and discharge portions 68 are provided in the left corner at the rear end of the substrate 51. With this, the pre-charge portions 67 and the discharge portions 68 are provided in an upper portion of the housing case 1, are provided at the upper rear end of the housing case 1, and are provided in the left corner at the upper rear end of the housing case 1.

When power supply is started from the battery modules 6 (battery 4) to the inverter 14 by a key-on operation, the pre-charge portions 67 perform processing to gradually supply power to the inverter 14 for about several seconds.

When power supply from the battery modules 6 (battery 4) to the inverter 14 is shut off by a key-off operation, the discharge portions 68 perform processing to discharge power remaining in the inverter 14 (capacitor) for about several seconds.

As shown in FIGS. 17 and 18, when three stacks 7 (battery modules 6) are housed in the housing case 1, the three stacks 7 are aligned adjacent to each other at predetermined gaps A1 and A2. The gaps A1 and A2 extend over the entire width of the stack 7 and over the entire height of the stack 7 and are positioned below the respective upper frames 40.

In the front stack 7 and the central stack 7 adjacent to each other, the front and central stacks 7 are provided so that the respective rear ends of the five battery modules 6 in the front stack 7 and the respective front ends of the five battery modules 6 in the central stack 7 face each other with a gap A1.

In the rear stack 7 and the central stack 7 adjacent to each other, the rear and central stacks 7 are provided so that the respective front ends of the five battery modules 6 in the rear stack 7 and the respective rear ends of the five battery modules 6 in the central stack 7 face each other with a gap A2.

Two fans 62 and 63 are provided on the substrate 51. The fans 62 and 63 are sirocco fans, and circular ventilation holes 62*a* and 63*a* are provided in respective lower portions of the fans 62 and 63.

The fan 62 sucks air from the ventilation hole 62*a* of the fan 62 and blows out the sucked air toward the front side. The fan 63 sucks air from the ventilation hole 63*a* of the fan 63 and blows out the sucked air toward the rear side.

The ventilation holes 62*a* and 63*a* of the fans 62 and 63 are respectively provided at positions facing the upper portions of the gaps A1 and A2 when viewed in a side view, and are respectively provided in the centers of the gaps A1 and A2 in the left-right direction when viewed in the plan view.

The ventilation holes 62*a* and 63*a* of the fans 62 and 63 have diameters set to be larger than the front-rear width of the upper frame 40. The ventilation holes 62*a* and 63*a* of the fans 62 and 63 protrude forward of the front end of the upper frame 40 and protrude rearward of the rear end of the upper frame 40, when viewed in a plan view.

As shown in FIGS. 9 and 10, the housing cover 5 is provided on the top of the housing case 1, and the housing cover 5 covers the top of the housing case 1, the substrate 51, the relay switches 58 to 61, the fans 62 and 63, the shut-off portion 66, the pre-charge portions 67, the discharge portions 68, and the like, which are shown in FIG. 18.

The housing cover 5 is formed by bending a plate material and includes a top surface 5*a*, a front surface 5*b*, a rear surface 5*c*, right and left side surfaces 5*d*, and right and left inclined surfaces 5*e*. The front surface 5*b*, the rear surface 5*c*, and the side surfaces 5*d* of the housing cover 5 extend in the vertical direction.

The top surface 5*a* of the housing cover 5 preferably has a forward-descending shape in which it descends toward the front side when viewed in a side view. The inclined surfaces 5*e* of the housing cover 5 are connected between the top surface 5*a* and the side surfaces 5*d* of the housing cover 5, and are preferably have a forward-descending shape in which they descend toward the front side when viewed in a side view and in a laterally-descending shape in which they descend toward the laterally outer side when viewed in a front view.

The side portions of the front surface 5*b* of the housing cover 5 are not adjacent to the front portions of the side surfaces 5*d* of the housing cover 5 and the front portions of the inclined surfaces 5*e* of the housing cover 5, and right and left openings 5*f* in a shape of an elongated gap are provided in the housing case 1. Since the fan 62 shown in FIGS. 17 and 18 blows out sucked air toward the front side, the openings 5*f* through which air can be passed are provided at the positions of the housing cover 5 facing the blowing direction of the fan 62.

The side portions of the rear surface 5*c* of the housing cover 5 are not adjacent to the rear portions of the side surfaces 5*d* of the housing cover 5 and the rear portions of the inclined surfaces 5*e* of the housing cover 5, and right and left openings 5*g* in a shape of an elongated gap are provided in the housing case 1. Since the fan 63 shown in FIGS. 17 and 18 blows out sucked air toward the rear side, the openings 5*g* through which air can be passed are provided at the positions of the housing cover 5 facing the blowing direction of the fan 63.

As shown in FIGS. 17 and 18, the fans 62 and 63 are activated with power supplied to the connection portion 55 by a key-on operation and are deactivated by a key-off operation.

When the fan 62 is activated, air in the gap A1 (air inside the housing case 1) is sucked from the ventilation hole 62*a* of the fan 62, and the fan 62 blows out the sucked air toward the front side. Air blown from the fan 62 easily flows out from the housing cover 5 through the openings 5*f* (see FIGS. 9 and 10) of the housing cover 5 and easily flows out into the cover 12.

When the fan 63 is activated, air in the gap A2 (air inside the housing case 1) is sucked from the ventilation hole 63*a* of the fan 63, and the fan 63 blows out the sucked air toward the rear side. Air blown from the fan 63 easily flows outside from the housing cover 5 through the openings 5*g* (see FIGS. 9 and 10) of the housing cover 5 and easily flows out into the cover 12.

In this case, the blowing direction (forward) of the fan 62 and the blowing direction (backward) of the fan 63 are set as opposite directions so that the blown air flows away from each other.

The fan 62 corresponds to the fan 62 for the gap A1 between the central stack 7 and one stack 7, and the fan 63 corresponds to the fan 63 for the gap A2 between the central stack 7 and the other stack 7.

When air blown from the fans 62 and 63 has flowed out from the housing cover 5 through the openings 5*f* and 5*g* of the housing cover 5, air inside the cover 12 is introduced into the housing cover 5 through the openings 5*f* and 5*g* (see FIGS. 9 and 10) of the housing cover 5.

As described above, when the air inside the housing case 1 is sucked by the fans 62 and 63, air inside the housing cover 5 (outside the housing case 1) is introduced into the housing case 1. In this case, the air inside the housing cover 5 (outside the housing case 1) is introduced into the housing case 1 mainly through the openings 51*a* in the substrate 51 while passing by the terminals 6*a* of the battery modules 6.

As described above, when the fans 62 and 63 are activated in the battery 4, air is circulated between the inside of the housing case 1 and the inside of the housing cover 5, and thus equalization of the temperatures of the air inside the housing case 1 and the air inside the housing cover 5 is realized, which promotes heat dissipation from the side plates 45 and 46 and the bottom plate 47 of the housing case 1 and heat dissipation from the housing cover 5 to cool the inside of battery 4.

As shown in FIGS. 4, 5, and 6, the top surface 12*a* of the cover 12 preferably has a forward-descending shape in which it descends toward the front side when viewed in a side view, and as shown in FIGS. 9 and 10, the top surface 5*a* and the inclined surfaces 5*e* of the housing cover 5 are preferably have a forward-descending shape in which they descend toward the front side when viewed in a side view.

As shown in FIG. 5, the top surface 5*a* and the inclined surfaces 5*e* of the housing cover 5 and the top surface 12*a* of the cover 12 are arranged at a predetermined distance in the up-down direction, and a space B1 is provided between the top surface 5*a* and the inclined surfaces 5*e* of the housing cover 5 and the top surface 12*a* of the cover 12, when viewed in a side view.

As shown in FIG. 6, the battery 4 (side plates 45) and the side surfaces 12*b* of the cover 12 are arranged at a predetermined distance in the left-right direction, and right and left spaces B2 are provided between the battery 4 (side plates 45) and the side surfaces 12*b* of the cover 12, when viewed in a plan view.

As the body moves forward, air is introduced into the cover 12 mainly through the front grille 12*c* of the cover 12. The air introduced into the cover 12 flows around the battery 4 while passing through the spaces B1 and B2 and flows out from the cover 12 mainly through the side grilles 12*d* and 12*e* of the cover 12. This promotes heat dissipation from the side plates 45 and 46 and the bottom plate 47 of the housing case 1 and heat dissipation from the housing cover 5 to cool the interior of the battery 4.

First Modification of Example Embodiment

In FIGS. 11 to 14, the lower supports 21 and 22 may be removed from the stacks 7 (battery modules 6) in advance and coupled to the housing case 1.

According to this configuration, it is sufficient to remove the bottom plate 47 (see FIG. 9) from the housing case 1, install the stacks 7 (battery modules 6) on the lower supports 21 and 22, and connect the bolts 20 to the battery modules 6 from the bottom of the first lower frame 41.

Second Modification of Example Embodiment

In FIGS. 11, 12, 15, and 16, the upper supports 23 and 24 may be removed from the stacks 7 (battery modules 6).

According to this configuration, it is sufficient to install the stacks 7 (battery modules 6) in the housing case 1, and then couple the upper supports 23 and 24 to the upper portion of the stacks 7 (battery modules 6) and to the upper frames 40 and 44.

Third Modification of Example Embodiment

The coupling portions 21*a* and 22*a* of the lower supports 21 and 22 may be elongated rectangular when viewed in a plan view.

The number of coupling portions 21*a* and 22*a* of the lower supports 21 and 22 may be respectively set to two and three, or four and five.

The number of coupling portions 22*a* of the lower support 22 may be larger than the number of coupling portions 21*a* at one edge of the lower support 21.

The coupling portions 23*a* and 24*a* of the upper supports 23 and 24 may be elongated rectangular when viewed in a plan view.

The number of coupling portions 23*a* and 24*a* of the upper supports 23 and 24 may be respectively set to three and two, or five and four.

The number of coupling portions 23*a* at one edge of the upper support 23 may be larger than the number of coupling portions 24*a* of the upper support 24.

Fourth Modification of Example Embodiment

The pre-charge portions 67 and the discharge portions 68 shown in FIG. 18 may be provided, on the upper portion (substrate 51) of the housing case 1, in a central portion, in the left-right direction, at the rear end, in the right corner at the rear end, or in a central portion, in the left-right direction, at the front end, or may be provided in the right or left corner at the front end, in a central portion, in the front-rear direction, at the right side end, in the front or rear corner at the right side end, in a central portion, in the front-rear direction, at the left side end, or in the front or rear corner at the left side end.

Instead of the pre-charge portions 67 and the discharge portions 68 being provided in close proximity to each other on the upper portion (substrate 51) of the housing case 1, they may be provided apart from each other on the upper portion (substrate 51) of the housing case 1.

The pre-charge portions 67 and the discharge portions 68 may be provided in a lower portion of a front portion of the housing case 1 or in a central portion of the front portion in the up-down direction, or in a lower portion of a rear portion of the housing case 1 or in a central portion of the rear portion in the up-down direction, or may be provided in a lower portion of a right side portion of the housing case 1 or in a central portion of the right side portion in the up-down direction, or in a lower portion of a left side portion of the housing case 1 or in a central portion of the left side portion in the up-down direction.

Fifth Modification of Example Embodiment

The blowing directions of the fans 62 and 63 shown in FIG. 18 may be set to rightward and leftward, and the openings 5*f* and 5*g* of the housing cover 5 shown in FIGS. 9 and 10 may be provided in the right and left side surfaces 5*d*.

According to this configuration, the fans 62 and 63 and the openings 5*f* and 5*g* of the housing cover 5 are provided close to each other, and thus air blown out from the fans 62 and 63 easily flows out from the housing cover 5 through the openings 5*f* and 5*g* of the housing cover 5.

Sixth Modification of Example Embodiment

The fans 62 and 63 shown in FIGS. 17 and 18 may be configured to suck air inside the housing cover 5 and blow out the air toward the gaps A1 and A2 (interior of the housing case 1) from the ventilation holes 62*a* and 63*a* of the fans 62 and 63.

According to this configuration, the air inside the housing case 1 flows out into the housing cover 5 while passing mainly by the terminals 6*a* of the battery modules 6 and passing through the openings 51*a* in the substrate 51.

Seventh Modification of Example Embodiment

The fans 62 and 63 shown in FIGS. 17 and 18 may also be provided on the side plate 45 or the bottom plate 47 of the housing case 1 while facing the side portions or the lower portions of the respective gaps A1 and A2.

According to this configuration, when the fans 62 and 63 are of a suction type, air inside the housing case 1 is sucked by the fans 62 and 63 and is blown into the cover 12 (see FIGS. 5 and 6), and air inside the cover 12 is introduced into the housing case 1 from the interior of the housing cover 5 while passing through the openings 5*f* and 5*g* in the housing cover 5.

When the fans 62 and 63 are of a blowing type, air inside the cover 12 (see FIGS. 5 and 6) is sucked by the fans 62 and 63 and is blown into the housing case 1, and air inside the housing case 1 flows out into the housing cover 5 and flows out into the cover 12 while passing through the openings 5*f* and 5*g* in the housing cover 5.

Eighth Modification of Example Embodiment

In the battery 4, one or two stacks 7 may be provided, or four or more stacks 7 may also be provided. Less than five or at least six battery modules 6 may be coupled to each other to define a single stack 7. A plurality of stacks 7 may be aligned in the left-right direction.

According to this configuration, the number of fans 62 and 63 is set to one or three or more according to the numbers of stacks 7 and gaps A1 and A2.

Ninth Modification of Example Embodiment

The front wheels 10 and the rear wheels 11 serve as a travel device according to an example embodiment of the present invention. Instead of the front wheels 10 and the rear wheels 11, right and left crawler travel devices (not shown) may be provided as the travel device on the body.

Example embodiments of the present invention are applicable to not only tractors but also other electric work vehicles such as electric carts and trucks, and to electric work vehicles in each of which a battery is installed in a rear portion of the body, and to autonomous travel or radio control electric work vehicles with no operator on board.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
a battery;
a motor to be driven by power from the battery; and
a travel device to be driven by the motor; wherein
the battery includes:
a stack in which a plurality of battery modules are coupled to each other;
a housing case in which a plurality of the stacks are housed and aligned adjacent to each other with a predetermined gap therebetween; and
a fan including a ventilation hole on an outer side of the housing case at a position facing the gap and being operable to be able to suck air in the housing case or supply air to the housing case via the ventilation hole;
wherein the housing case includes an opening through which air is passable, the opening being provided at a position facing a terminal of the battery modules.

2. The electric work vehicle according to claim 1, wherein
the plurality of battery modules are coupled to each other and aligned adjacent to each other to define the stack; and
adjacent stacks are provided in a manner such that terminals of the plurality of battery modules in one stack and terminals of the plurality of battery modules in another stack face each other spaced by the gap.

3. The electric work vehicle according to claim 1, wherein
the plurality of stacks are aligned in a horizontal direction; and
the ventilation hole faces an upper portion of the gap.

4. The electric work vehicle according to claim 3, further comprising a housing cover covering the fan and an upper portion of the housing case.

5. The electric work vehicle according to claim 4, wherein the housing cover includes an opening through which air is passable at a position facing a blowing direction or a sucking direction of the fan.

6. The electric work vehicle according to claim 3, wherein
the fan is capable of sucking air in the housing case; and
in the one stack adjacent to one side of a central stack and another stack adjacent to another side of the central stack, a blowing direction of the fan with respect to the gap between the central stack and the one stack, and a blowing direction of the fan with respect to the gap between the central stack and the other stack are set as opposite directions so that blown air flows away from each other.

7. The electric work vehicle according to claim 3, further comprising:
a driving section in which an operator rides and performs driving; and a cover in front of the driving section and includes, in a front portion of the cover, an introduction section through which external air is introduced, the cover including a top surface with a forward-descending shape in which the top surface descends toward a front side; wherein the battery is housed in the cover; and a housing cover that covers the fan and a top of the housing case is provided; and the housing cover includes a top surface with a forward-descending shape in which the top surface descends toward a front side, and the top surface of the housing cover and the top surface of the cover are spaced at a predetermined distance in an up-down direction.

* * * * *